United States Patent
Longman et al.

(10) Patent No.: US 11,793,349 B2
(45) Date of Patent: Oct. 24, 2023

(54) BOTTLE OPENING AND ADDITIVE DISPENSING APPARATUS

(71) Applicant: HODGES & DRAKE DESIGN LIMITED, Leicester (GB)

(72) Inventors: Daniel Longman, Leicester (GB); Duncan Shea-Simonds, Leicester (GB); Kevin Hodges, Leicester (GB)

(73) Assignee: HODGES & DRAKE DESIGN LIMITED, Leicester (GB)

( * ) Notice: Subject to any disclaimer, the term of this patent is extended or adjusted under 35 U.S.C. 154(b) by 1190 days.

(21) Appl. No.: 16/461,106

(22) PCT Filed: Nov. 20, 2017

(86) PCT No.: PCT/GB2017/053485
§ 371 (c)(1),
(2) Date: May 15, 2019

(87) PCT Pub. No.: WO2018/096323
PCT Pub. Date: May 31, 2018

(65) Prior Publication Data
US 2020/0060465 A1    Feb. 27, 2020

(30) Foreign Application Priority Data

Nov. 22, 2016 (GB) ..................................... 1619695
Mar. 27, 2017 (GB) ..................................... 1704785

(51) Int. Cl.
*A47J 31/40* (2006.01)
*A47J 31/41* (2006.01)
(Continued)

(52) U.S. Cl.
CPC ............... *A47J 31/407* (2013.01); *A23L 2/52* (2013.01); *A47J 31/402* (2013.01); *A47J 31/404* (2013.01); *A47J 31/4425* (2013.01); *B67B 7/16* (2013.01)

(58) Field of Classification Search
CPC .... A47J 31/402; A47J 31/407; A47J 31/4425; A47J 31/404; B67B 7/162; B67B 7/16; A23L 2/52
See application file for complete search history.

(56) References Cited

U.S. PATENT DOCUMENTS 1,710,623 A    4/1929   Johnson
4,295,392 A   10/1981   Peck
(Continued)

FOREIGN PATENT DOCUMENTS

CH      564299 A5    7/1975
EP     1489042 A1   12/2001
(Continued)

OTHER PUBLICATIONS

ISA/EP; International Search Report and Written Opinion for International Patent Application No. PCT/GB2017/053485 dated Mar. 8, 2018, 12 pages.
(Continued)

*Primary Examiner* — Dana Ross
*Assistant Examiner* — Kuangyue Chen
(74) *Attorney, Agent, or Firm* — NK Patent Law

(57) ABSTRACT

An apparatus (20) for dispensing an additive into a liquid in a container comprises a support structure (22) and a container holder (28), supported by the support structure (22), for holding a container (21) containing a liquid. The apparatus (20) also includes a capsule holder (38) for holding a capsule (40) containing an additive, for example a liquid, semi-liquid or powder, and a manipulator device (41) which
(Continued)

is operable to manipulate the capsule (40), for example by crushing it, to thereby dispense the additive into the liquid in the container (21).

11 Claims, 34 Drawing Sheets

(51) Int. Cl.
*A47J 31/44* (2006.01)
*B67B 7/16* (2006.01)
*B65D 83/00* (2006.01)
*A23L 2/52* (2006.01)

(56) References Cited

U.S. PATENT DOCUMENTS

| | | |
|---|---|---|
| 2005/0045778 A1 | 3/2005 | McCall |
| 2008/0083301 A1* | 4/2008 | Messina .................... B65F 1/12 81/3.25 |
| 2008/0223877 A1 | 9/2008 | Gevorgian |
| 2011/0278184 A1 | 11/2011 | Middleman et al. |
| 2012/0148707 A1 | 6/2012 | Lackey et al. |

FOREIGN PATENT DOCUMENTS

| | | | |
|---|---|---|---|
| EP | 1489042 A1 * | 12/2004 | ........... B67D 1/0024 |
| ES | 1029669 U | 6/1995 | |
| JP | 2015127207 A | 7/2015 | |
| RU | 2384289 C2 | 3/2010 | |
| WO | 2005077811 A2 | 8/2005 | |
| WO | 2012064885 A1 | 5/2012 | |

OTHER PUBLICATIONS

IPO; Search Report for Great British Patent Application No. GB1704785.3 dated Jul. 21, 2017, 1 page.

FIIP, Official Action and Search Report for corresponding Russian Patent Application No. 2019119388, dated Mar. 30, 2021.

* cited by examiner

BOTTLE OPENING AND ADDITIVE DISPENSING APPARATUS

CROSS-REFERENCE TO RELATED APPLICATIONS

This application is a U.S. National Stage application of International Application No. PCT/GB2017/053485, filed on 20 Nov. 2017, which claims priority to United Kingdom Patent Application No. 1704785.3, filed on 27 Mar. 2017, and United Kingdom Patent Application No. 1619695.8, filed on 22 Nov. 2016, the contents of which are all hereby incorporated herein by reference.

TECHNICAL FIELD

The present disclosure relates generally to an apparatus for dispensing an additive into a liquid in a container. Embodiments of the present disclosure relate in particular, but not exclusively, to an apparatus for flavouring a bottled beverage, for example a bottled carbonated beverage.

TECHNICAL BACKGROUND

There are many circumstances in which it can be desirable to add an additive to a primary liquid. One example is in the field of flavoured beverages, such as beers and ciders, which have increased in popularity during recent years. Typically, the addition of a flavouring substance takes place when the beverage is produced. This limits consumer choice and potentially limits the revenue available for the drinks producer.

It is desirable to offer increased consumer choice by allowing a standard beverage, alcoholic or non-alcoholic, to be flavoured with a flavouring substance or otherwise altered by the addition of an additive at the point of serve according to the preference of an individual consumer. US 2011/0278184 A1 discloses a beverage flavouring applicator which enables a flavouring substance to be dispensed into a beverage flavouring container allowing the beverage to be customized at the point of serve. However, the beverage flavouring applicator has a complex construction and cannot be used easily with different flavouring substances due to cross-contamination of parts of the applicator. There is, therefore, a need for an improved apparatus for dispensing an additive into a liquid in a container.

SUMMARY OF THE DISCLOSURE

According to a first aspect of the present disclosure, there is provided an apparatus for dispensing an additive into a liquid in a container, the apparatus comprising:
 a support structure;
 a container holder for holding a container containing a liquid, the container holder being supported by the support structure;
 a capsule holder for holding a capsule containing an additive; and
 a manipulator device operable to manipulate the capsule to dispense the additive into a liquid in the container.

The apparatus allows an additive to be easily added to liquid in a container in a simple and effective manner. The additive could, for example, comprise any one or more of a flavouring substance, a colouring, or one or more functional additives such as vitamins, minerals, herbs, stimulants or concentrates.

According to a second aspect of the present disclosure, there is provided an apparatus for flavouring a bottled beverage, the apparatus comprising:
 a support structure;
 a bottle holder for holding a bottle containing a beverage, the bottle holder being supported by the support structure;
 a capsule holder for holding a capsule containing a flavouring substance; and
 a manipulator device operable to manipulate the capsule to dispense the flavouring substance into the bottle to create a flavoured beverage.

The apparatus allows any liquid or beverage, for example a bottled carbonated beverage such as beer, to be flavoured or otherwise altered with an additive chosen by the consumer at the point of serve in a simple and effective manner. The consumer is, thus, able to choose from a wider variety of additives, including flavourings, than might previously have been available (for example in the form of pre-flavoured bottled alcoholic beverages), thereby potentially making the beverage more appealing.

From the view point of a beverage producer, the production process is simplified because, in the case of a beverage, the beverage no longer has to be flavoured during production and stored in a bottle that requires specific labelling, etc. This means that a wider variety of flavourings and other additives can be offered to the consumer at the point of serve. Furthermore, if a certain additive, e.g. flavouring, proves to be unpopular, it is likely that only the unpopular additive and capsule in which it is contained (inexpensive components compared to the beverage) will not be consumed whilst the remainder of the beverage will be consumed in conjunction with more popular additives that are available at the point of serve. The level of consumption, and hence popularity, of different additives would also provide extremely useful feedback to the beverage producer, for example enabling them to develop new flavourings or other additives and to discontinue unpopular flavourings or other additives.

The apparatus, and in particular the support structure, may be dimensioned for location on a counter top. The apparatus may, for example, be dimensioned to receive a bottled liquid having a volume of 330 ml.

In typical embodiments, the manipulator device is manually operable by a user to manipulate the capsule to dispense the additive into the container. However, other embodiments are contemplated in which the manipulator device is operated by a drive mechanism, for example a motorized drive.

The manipulator device may be a compression device operable to apply a compressive force to the capsule to rupture the capsule and thereby dispense the additive into the container.

In alternative embodiments, the manipulator device may be a cutting device or a piercing device operable to penetrate the capsule, thereby enabling the additive to exit from the capsule into the container.

The capsule holder may be positioned above the container holder. In this configuration, the additive can be dispensed in a generally downward direction into the container.

The apparatus may include a container opener which may be operable to engage a cap on the container and to remove the cap prior to manipulation of the capsule by the manipulator device, for example prior to compression of the capsule by the compression device. The container opener may be manually operable by a user. The provision of a container opener, integrated into the apparatus, is advantageous because it avoids the need to remove the cap before inserting the container into the container holder.

The container opener may be configured to apply a removal force to the cap to remove it from the container. The container opener may be configured to apply a removal force to the cap to lever the cap off the container. The container opener is particularly suitable for use with crown caps which are commonly used with bottled beverages.

The cap may be a screw cap having an internal thread and the container opener may be configured to apply a removal force to the screw cap to remove it from the container. The container opener may be configured to apply a removal force, e.g., a removal torque, to the screw cap to rotate the screw cap and thereby remove it from the container, for example during movement of the container holder from a first position towards a second position. The container opener may comprise a removal arm having formations, for example tooth formations, which are adapted to engage formations provided around the outer circumferential surface of the screw cap. The cooperation between the formations on the removal arm and the formations provided around the outer circumferential surface of the screw cap results in the application of the removal torque to the screw cap during movement of the container holder from the first position towards the second position.

The apparatus may be arranged so that a single operation, for example a single manual operation by a user, causes the application of the removal force by the container opener and thereafter the manipulation of the capsule by the manipulator device, for example the application of the compressive force by the compression device. Thus, the cap is removed and the additive is dispensed into the container by a single operation, thereby providing a quick and simple way of dispensing the additive into the liquid in the container.

The apparatus may include a bin. The apparatus may be arranged to eject the capsule from the manipulator device into the bin following dispensing of the additive from the capsule into the container. The apparatus may be arranged to eject the compressed capsule from the compression device into the bin following dispensing of the additive from the capsule into the container. The apparatus may be arranged to eject the cap into the bin following removal from the container.

In a first embodiment, the container holder may be rotatably mounted on the support structure, for example for movement between a first position and a second position.

In a first implementation of the first embodiment, the container holder may be rotatably mounted on the support structure for movement between a first position in which the container is disposed at an angle to the vertical and a second position in which the container is disposed in a substantially vertical upright position.

In a second implementation of the first embodiment, the container holder may be rotatably mounted on the support structure for movement between a first position in which the container is disposed in a substantially vertical upright position and a second position in which the container is disposed at an angle to the vertical.

The manipulator device may be arranged to manipulate the capsule to dispense the additive during movement of the container holder from the first position to the second position. The compression device may be arranged to apply said compressive force to the capsule to rupture the capsule during movement of the container holder from the first position to the second position.

The container opener may be arranged to remove the cap from the container during movement of the container holder from the first position to the second position.

In this first embodiment, the aforesaid single operation is provided by movement, for example movement by a user, of the container holder from the first position to the second position. This provides a simple and effective way to remove the cap from a container and to dispense a desired additive into the container.

The container holder may be movable from the second position to the first position and the container containing the liquid and dispensed additive may be removable from the container holder when the container holder is in the first position.

In a second embodiment, the container holder may be formed in the support structure to hold a container in a substantially vertical upright position. The apparatus may include an operating lever which may be movable, for example by a user, between a first position and a second position to engage the container opener with a cap fitted to the container. The container remains static in this embodiment and the apparatus is operated upon movement of the operating lever, for example by a user.

The operating lever may be movable, for example by a user, from the second position to a third position and the container opener may be arranged to remove the cap from the container during movement of the operating lever from the second position to the third position.

The manipulator device may be arranged to manipulate the capsule to dispense the additive during movement of the operating lever from the second position to the third position. The compression device may be arranged to apply said compressive force to the capsule to rupture the capsule during movement of the operating lever from the second position to the third position.

In this second embodiment, the aforesaid single operation is provided by operation of the operating lever, and more particularly by movement of the operating lever, for example by a user, from the second position to the third position. Again, this provides a simple and effective way to remove the cap from a container and to dispense a desired additive into the container.

The operating lever may be biased for return movement from the third position to the first position. The container containing the liquid and dispensed additive may be removable from the container holder when the operating lever is in the first position.

DETAILED DESCRIPTION OF EMBODIMENTS

Figure 1A:
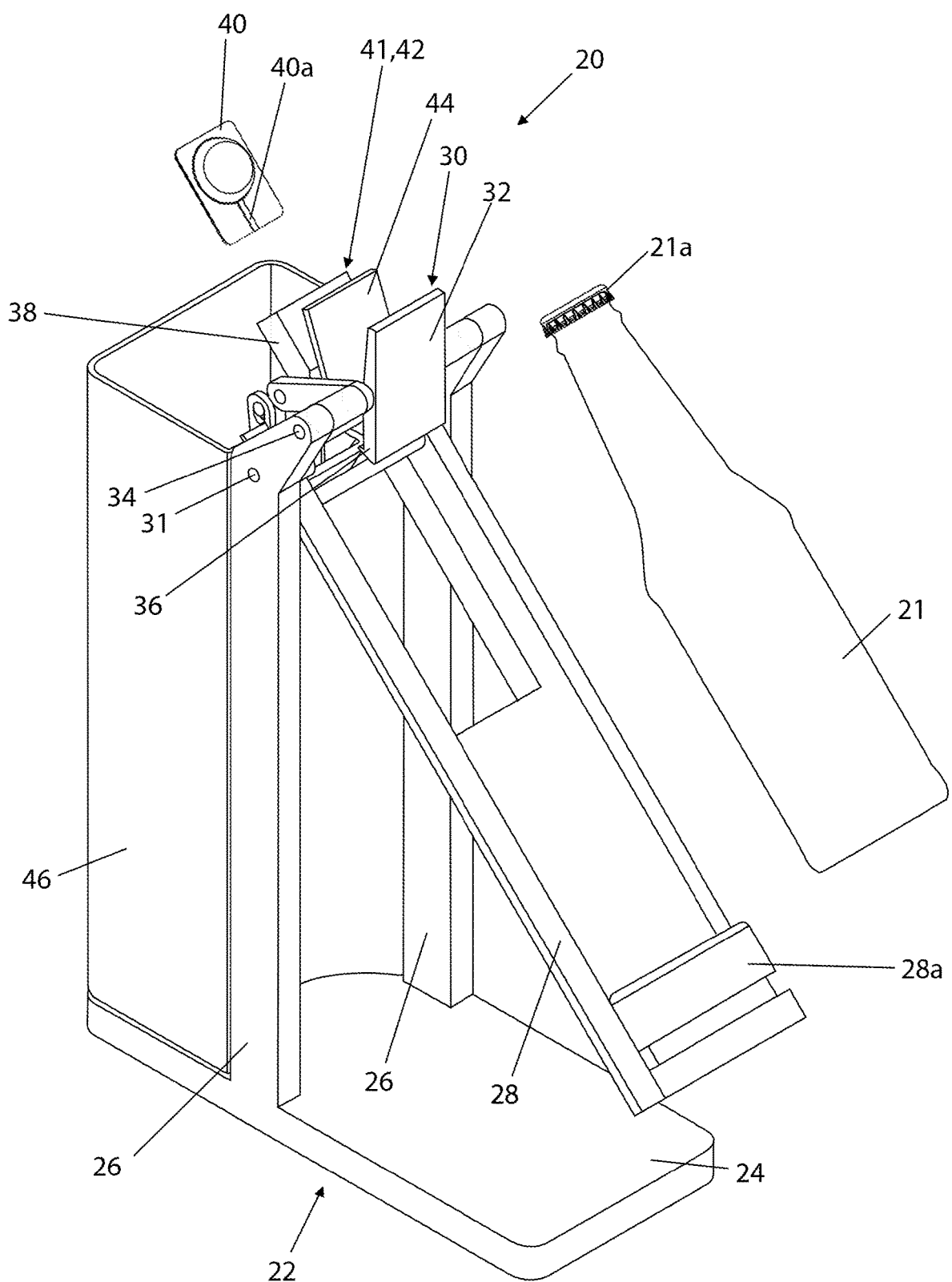
FIGS. 1a and 1b are perspective and diagrammatic side views respectively of a first embodiment of an additive dispensing apparatus and a container containing a liquid for insertion into a container holder.
Figure 1B:
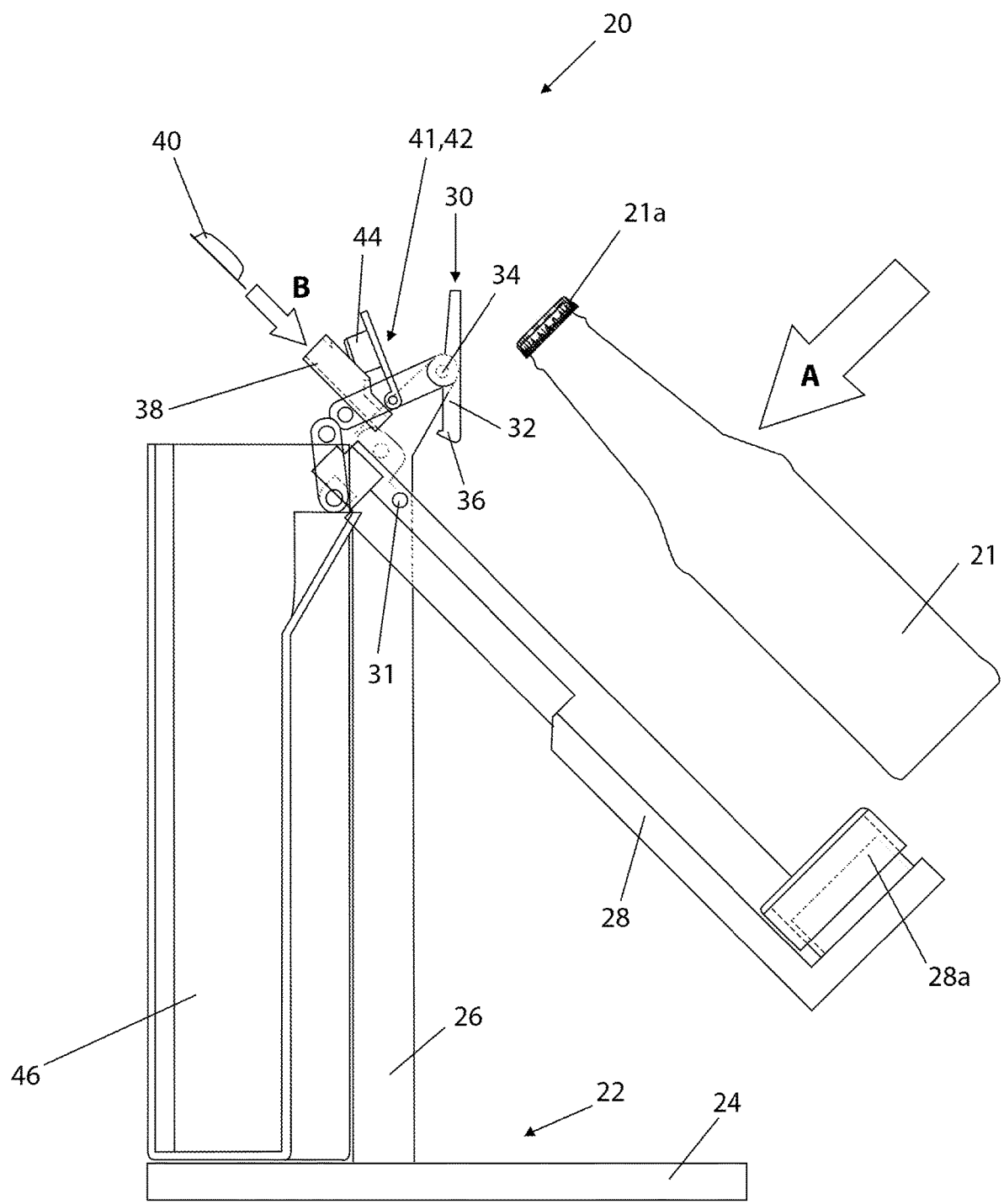

Embodiments of the present disclosure will now be described by way of example only and with reference to the accompanying drawings.

Referring initially to FIGS. 1 to 8, there is shown a first embodiment of an additive dispensing apparatus 20 for dispensing an additive into a container in the form of a bottle 21 which may contain a beverage, for example a carbonated bottled beverage such as beer. The apparatus 20 comprises a support structure 22 dimensioned for location on a counter top, such as a bar counter. The support structure 22 has a horizontal base member 24 which is locatable on a counter top and a pair of vertical support members 26. A container holder in the form of a bottle holder 28 is rotatably mounted on an upper end of the upright support members 26 by a pivotal mounting 31. In a typical arrangement, the bottle holder 28 is dimensioned to receive a bottle 21 having a volume of 330 ml. It will, however, be understood that the bottle holder 28 could be dimensioned to receive a bottle 21 or other suitable container having a different volume. The bottle holder 28 includes support means in the form of a support member 28a for supporting the base of the bottle 21. The support member 28a may be resiliently biased, for example may be cushioned or spring-biased, to urge an inserted bottle 21 in a generally upward direction.

The apparatus 20 includes a container opener in the form of a bottle opener 30 for engaging a crown cap 21a fitted to the bottle 21. The bottle opener 30 comprises a pawl 32 which is rotatably mounted on a shaft 34. The pawl 32 includes a catch member 36. The pawl 32 rotates about the shaft 34 to allow a bottle 21 to be inserted into the bottle holder 28, as depicted by arrow A in FIG. 1b. Once the bottle 21 has been inserted into the bottle holder 28, the pawl 32 rotates about the shaft 34 to the position shown in FIG. 2 in which the catch member 36 engages an underside of a lower rim of the crown cap 21a.

The apparatus 20 includes a capsule holder 38 which is positioned above the bottle holder 28 and mounted on an upper end of the bottle holder 28 for movement therewith as the bottle holder 28 is rotated. A capsule 40 containing a desired additive is inserted into the capsule holder 38 as depicted by arrow B in FIG. 1b either prior to, or after, insertion of the bottle 21 into the bottle holder 28. The capsule 40 can contain any suitable additive, typically a liquid, semi-liquid or powder, which is intended to alter the characteristics of the beverage contained in the bottle 21. The capsule 40 has a frangible seal (not shown) or predetermined point of weakness (not shown) and an associated outlet channel 40a.

The apparatus 20 includes a manipulator device 41 which is manually operable by a user to dispense the additive from the capsule 40 into the bottle 21. The manipulator device 41 is a compression device 42 in the form of a compression block 44. As will be explained in further detail below, the compression block 44 applies a compression force to the capsule 40 during movement of the bottle holder 28 to rupture the capsule 40 and thereby dispense the additive inside the capsule 40 into the bottle 21.

Figure 2:
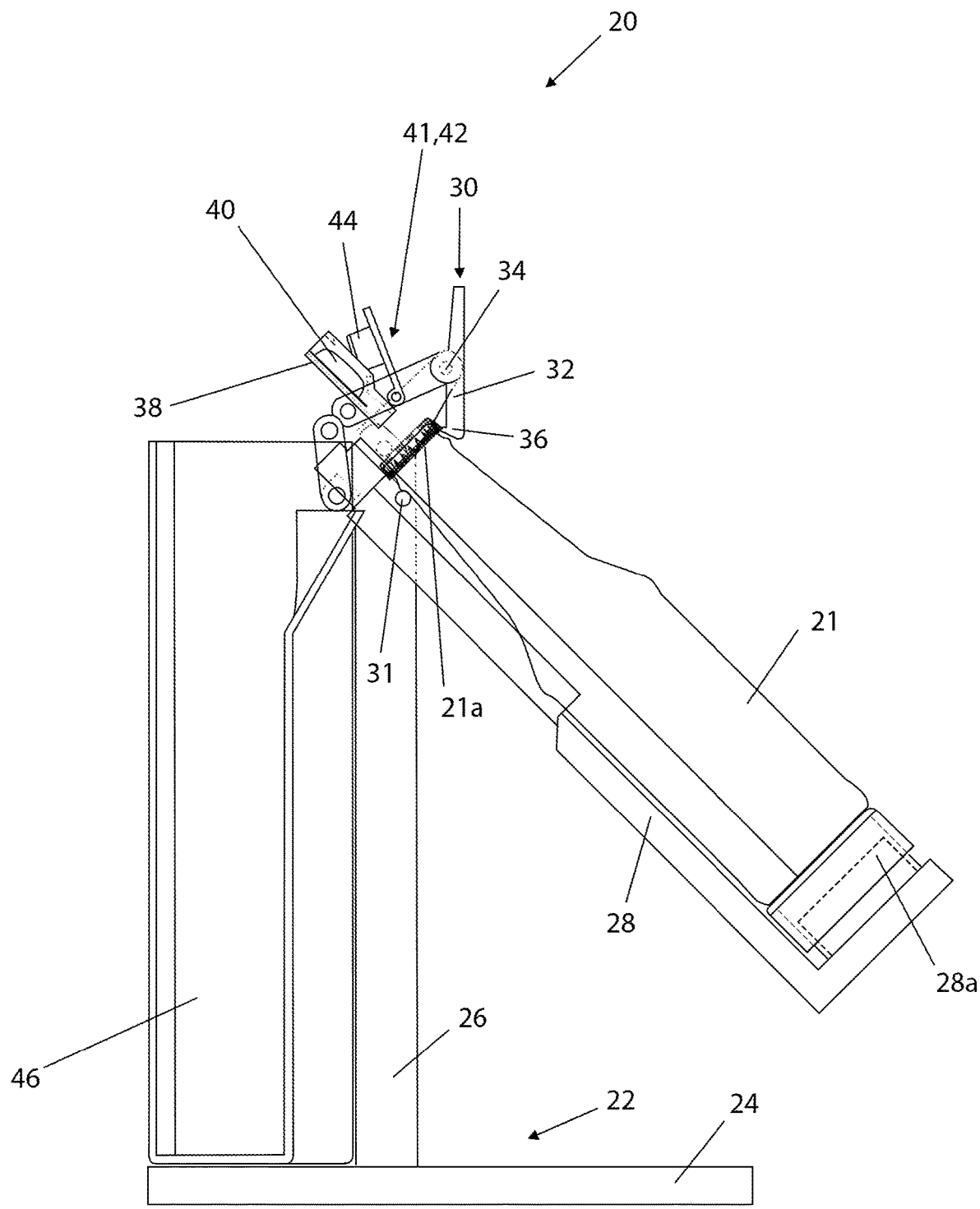
FIG. 2 is a view similar to FIG. 1b, with the container inserted in the container holder.
Figure 3:
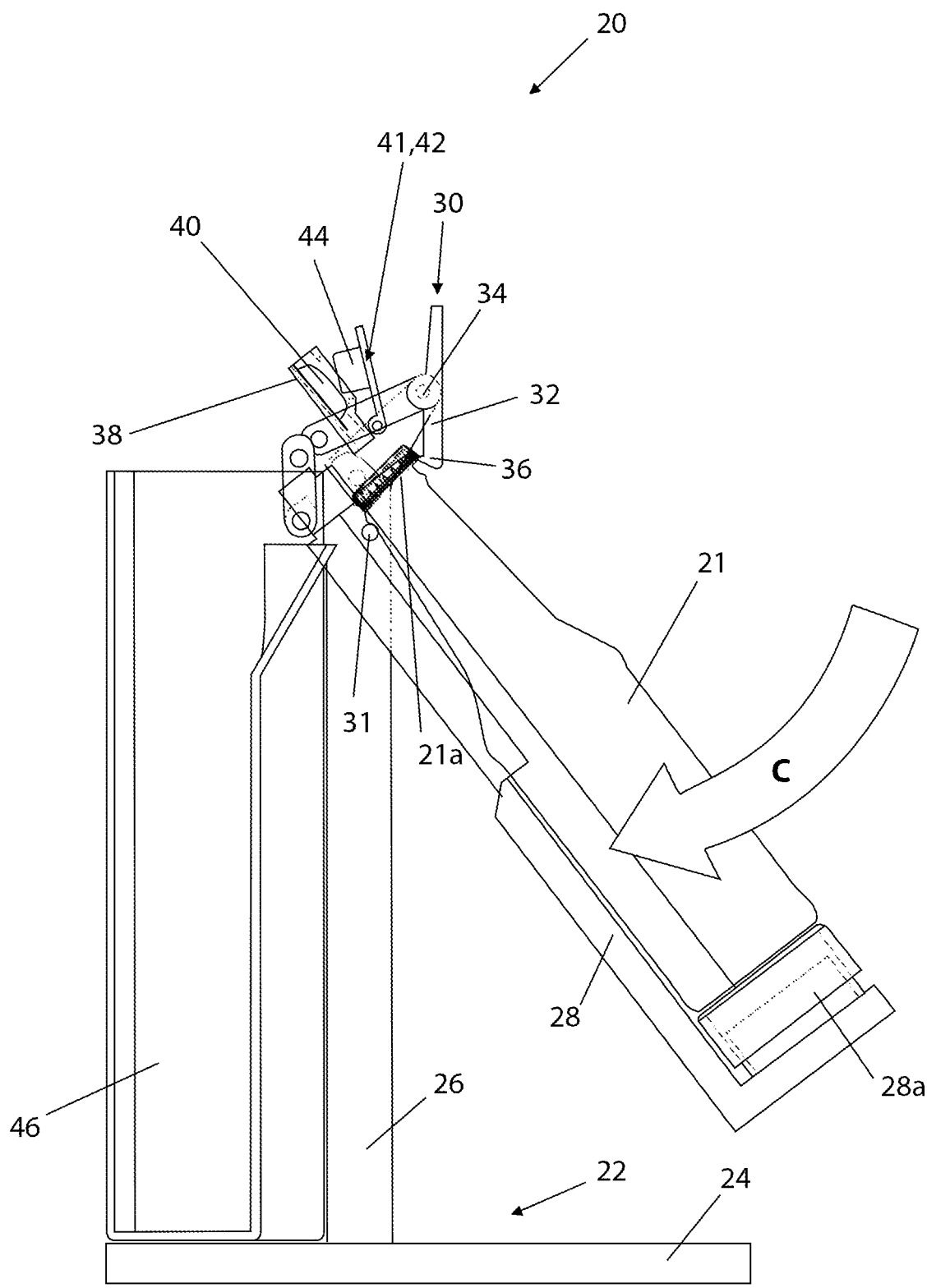
FIGS. 3 to 6 illustrate the movement of the container holder from a first position shown in FIGS. 1a, 1b and 2 to a second position shown in FIG. 6.
Figure 4:
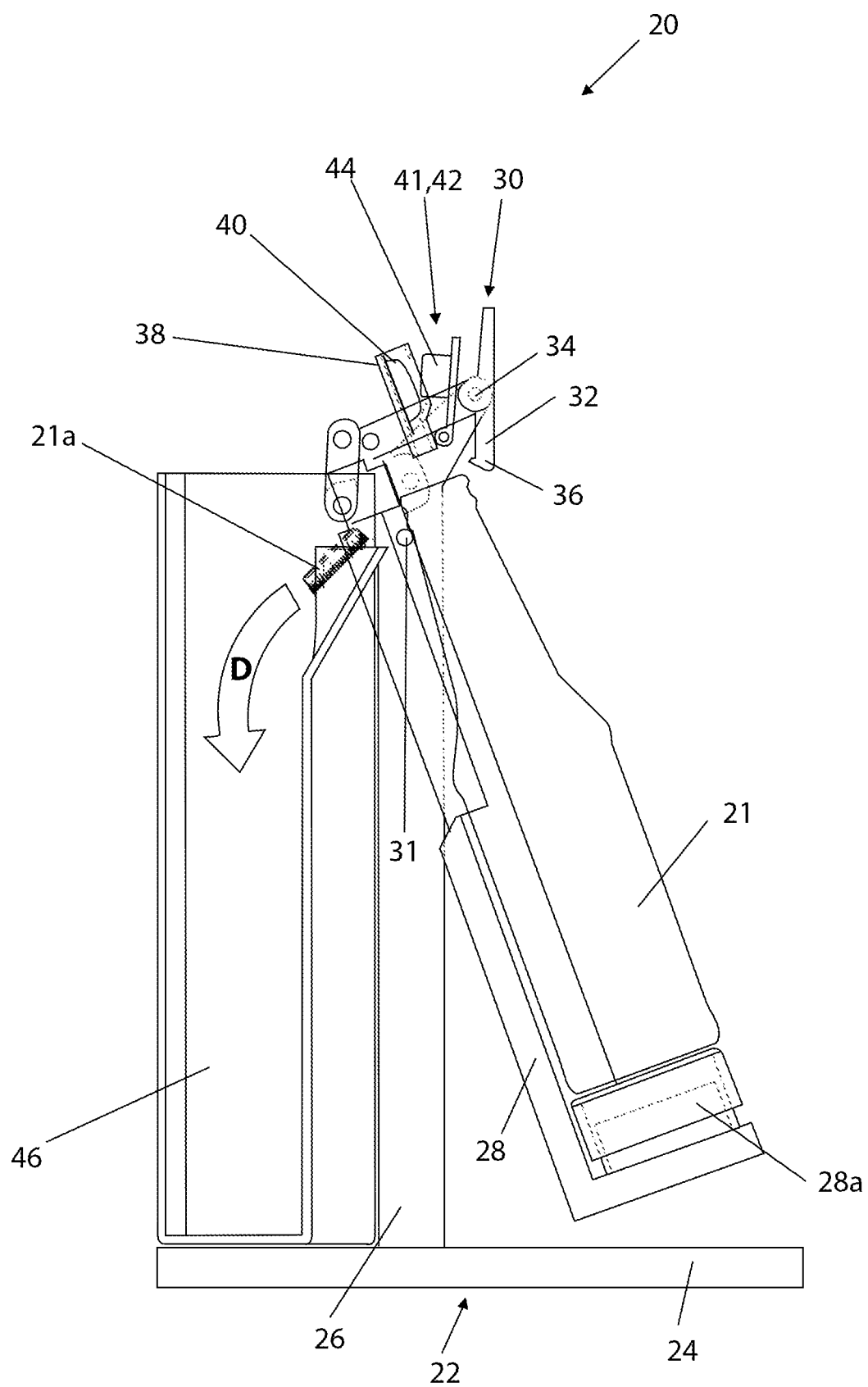
Figure 5:
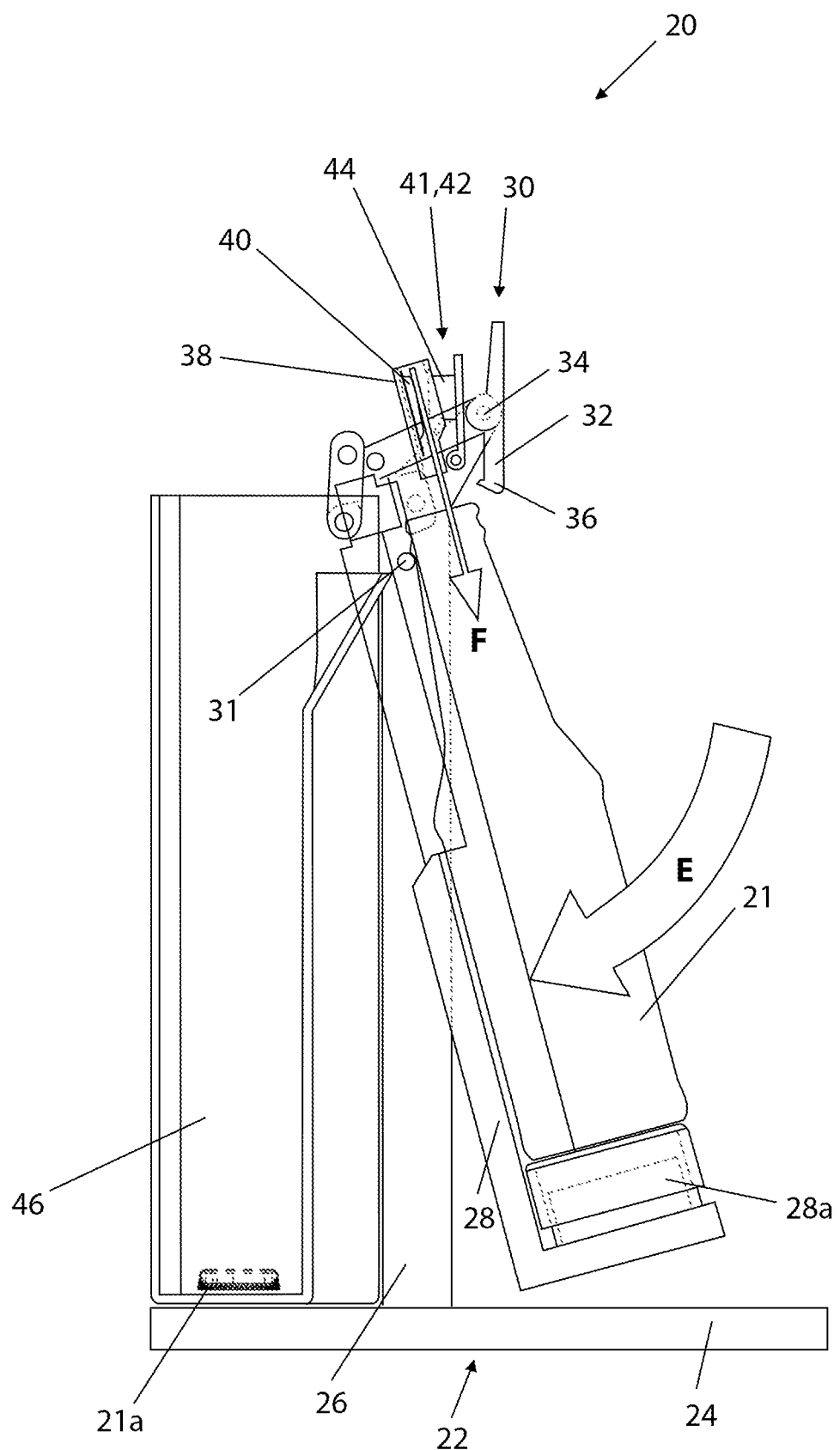

The apparatus 20 is shown in FIG. 2 with the bottle holder 28 in a first position following insertion of a bottle 21 containing a beverage into the bottle holder 28. In order to operate the apparatus 20, a user applies a gentle force to the bottle 21, as depicted by arrow C in FIG. 3, thereby rotating the bottle holder 28, and the bottle 21 inserted therein, in a clockwise direction (as viewed in the figures) about the pivotal mounting 31. During movement of the bottle holder 28 from the first position shown in FIG. 2 to a second position shown in FIG. 6, a removal force is initially applied by the bottle opener 30, and specifically by the catch member 36, to the lower rim of the crown cap 21a thereby removing the crown cap 21a from the bottle 21 as best seen in FIGS. 3 and 4. The apparatus 10 includes a bin 46, removably mounted on the support structure 22, and the cap 21a is ejected into the bin 46 following removal from the bottle 21 as depicted by arrow D in FIG. 4.

Figure 6:
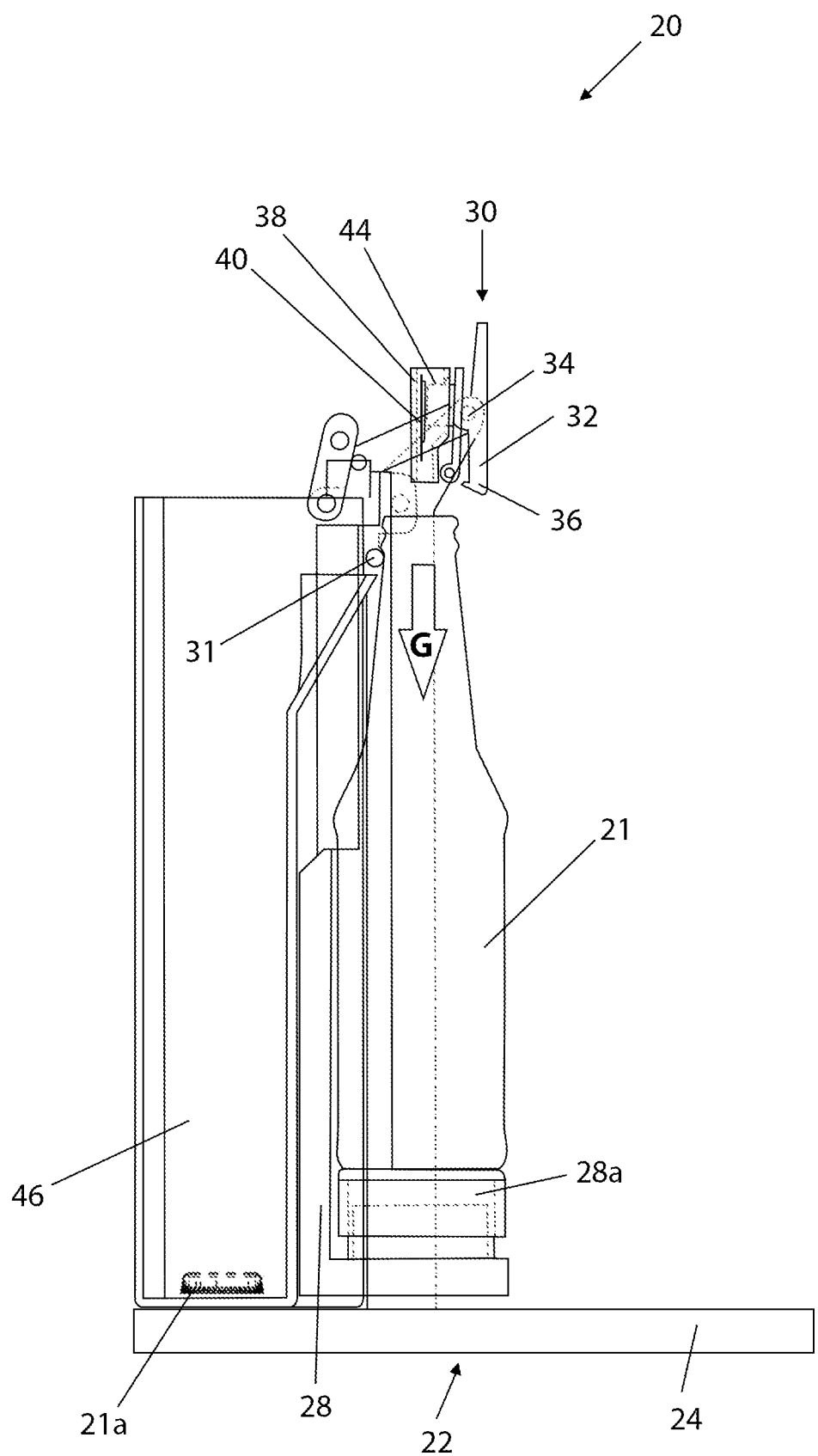

Further movement of the bottle holder 28 from the intermediate position shown in FIG. 4 towards the second position shown in FIG. 6, as depicted by arrow E, rotates the capsule holder 38, and hence the capsule 40 contained therein, towards the compression block 44 so that the compression block 44 applies a compressive force to the capsule 40 to crush, and thereby rupture, the capsule 40. The capsule holder 38 and capsule 40 are arranged so that the capsule 40 is oriented with the outlet channel 40a pointing towards the open top of the bottle 21. Consequently, when the capsule 40 is ruptured by the compression block 44, the additive is dispensed from the capsule 40 by jetting directly from the outlet channel 40a into the bottle 21, as depicted by arrows F and G in FIGS. 5 and 6 respectively. By virtue of this delivery mechanism, the additive does not contaminate any part of the additive dispensing apparatus 20. This is highly advantageous because it enables capsules 40 containing different additives, such as flavouring substances, to be used sequentially in the apparatus 20 without any contamination of the apparatus 20 occurring. This avoids the need to sanitize or flush the apparatus 20 prior to using a capsule 40 containing a different additive.

Figure 7:
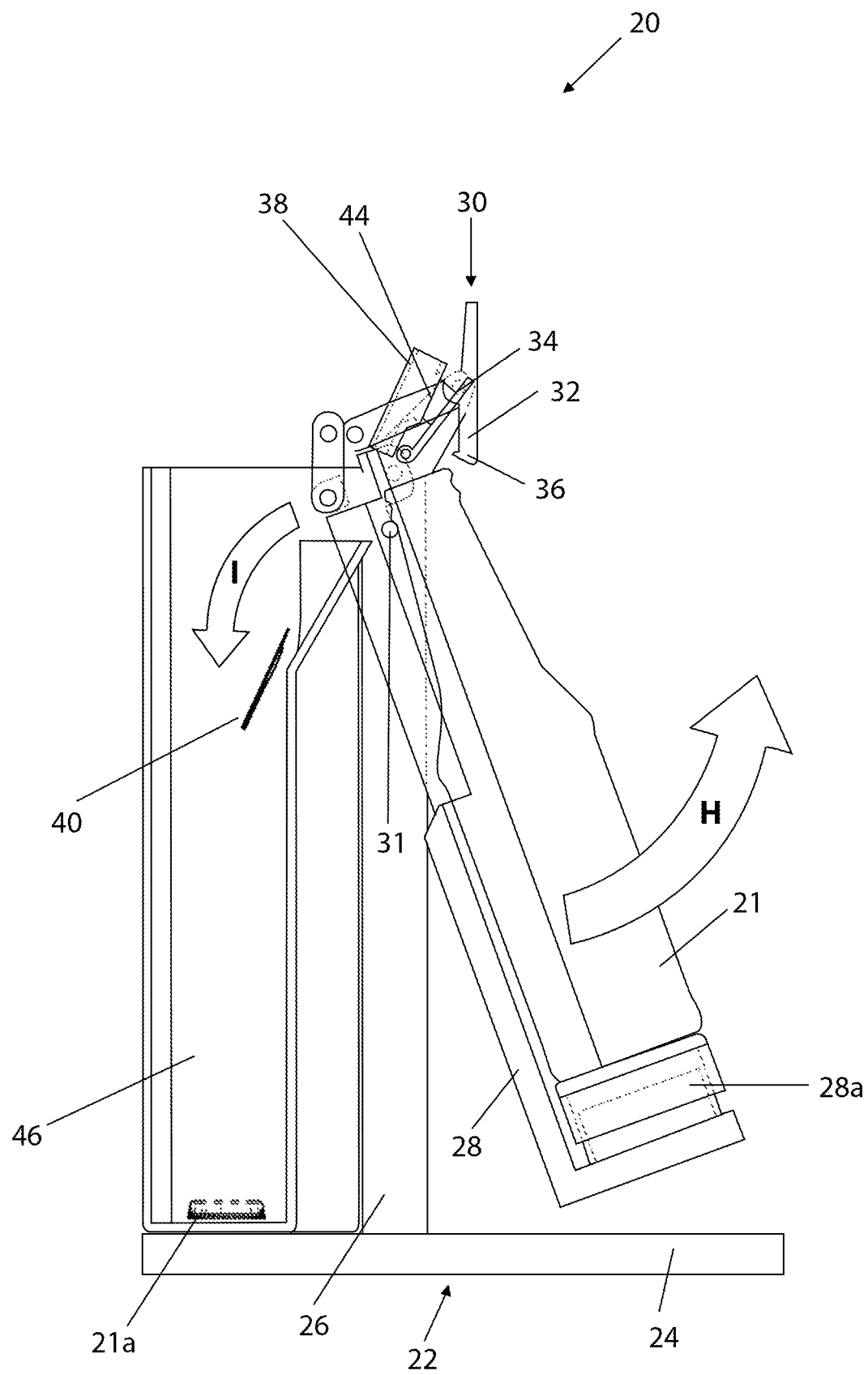
FIGS. 7 and 8 illustrate the return movement of the container holder from the second position shown in FIG. 6 to the first position shown in FIG. 8 to allow removal of the container from the container holder.
Figure 8:
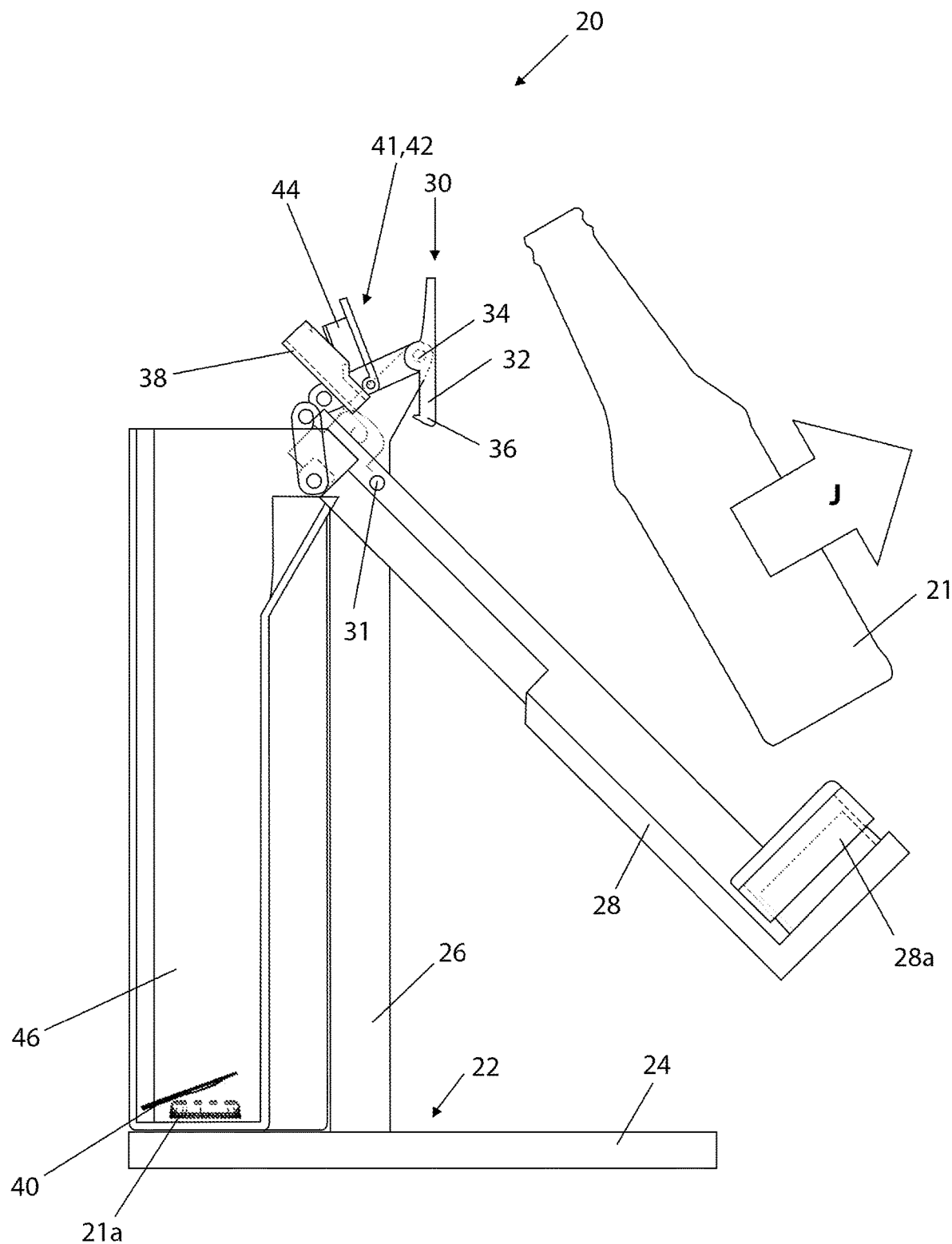

After the additive has been dispensed from the capsule 40 into the bottle 21, a user applies a gentle force to the bottle holder 28, to rotate the bottle holder 28, and the bottle 21 inserted therein, in an anti-clockwise direction (as viewed in the figures) about the pivotal mounting 31 (see arrow H in FIG. 7). Thus, the bottle holder 28 is returned from the second position to the first position. During initial movement of the bottle holder 28 from the second position towards the first position, the compression block 44 disengages from the capsule holder 38. This releases the used (compressed) capsule 40 from the capsule holder 38 and the used capsule 40 is ejected into the bin 46 as depicted by arrow I in FIG. 7. Finally, once the bottle holder 28 has been returned to the first position shown in FIG. 8, the bottle 21 containing the beverage and additive is removed from the bottle holder 28, as depicted by arrow J, and is ready for consumption.

Referring now to FIGS. 9 to 16, there is shown a second embodiment of an additive dispensing apparatus 60. The additive dispensing apparatus 60 has some similarities with the additive dispensing apparatus 20 illustrated in FIGS. 1 to 8 and corresponding components are identified using corresponding reference numerals.

The apparatus 60 comprises a support structure 62 dimensioned for location on a counter top, such as a bar counter. In the illustrated embodiment, the support structure 62 includes an L-shaped mounting member 64 which enables the apparatus 60 to be mounted on an edge region of a counter top. A container holder in the form of a bottle holder 68 is formed in the support structure 62 and is typically dimensioned to receive a bottle 21 having a volume of 330 ml. As with the first embodiment, it will be understood that the bottle holder 68 could be dimensioned to receive a bottle 21 or other suitable container having a different volume. The bottle holder 68 is arranged to orient an inserted bottle 21 in a substantially vertical upright position and includes support means in the form of a support surface 68*a* for supporting the base of an inserted bottle 21.

The apparatus 60 includes an operating lever 70 which is pivotally mounted with respect to the support structure 62 at pivotal mounting 74. The operating lever 70 includes a user-operable handle 76 on one side of the pivotal mounting 74 and a lever arm 72 on an opposite side of the pivotal mounting 74. The handle 76 and the lever arm 72 are disposed at an angle of substantially 90° with respect to each other.

The apparatus 60 includes a container opener in the form of a bottle opener 80 for engaging a crown cap 21*a* fitted to the bottle 21. The bottle opener 80 is integrally formed with the operating lever 70 and comprises spring-biased pawl 82 which is pivotally mounted with respect to the operating lever 70 at pivotal mounting 84.

The apparatus 60 includes a capsule holder 86 which is fitted to an upper part of the support structure 62 above the bottle holder 68. A capsule 40 containing a desired additive, such as a flavouring substance, is inserted into the capsule holder 86 as depicted by arrow K in FIG. 9*b* either prior to, or after, insertion of the bottle 21 into the bottle holder 68 (arrow L). The capsule 40 is the same as that described above with respect to FIGS. 1 to 8.

The apparatus 60 includes a compression device 42 in the form of a piston 88. The piston 88 is pivotally mounted at a first end of a crank arm 90 and is movable by the crank arm 90 to apply a compression force to the capsule 40 to rupture the capsule 40 and thereby dispense the additive inside the capsule 40 into the bottle 21. The crank arm 90 includes an elongate track 92 in which an end of the lever arm 72 is mounted by a pin 73 for both pivotal and linear motion. Consequently, movement of the handle 76 by a user causes movement of the crank arm 90 and hence the piston 88, as will be described in more detail below.

Figure 9A:
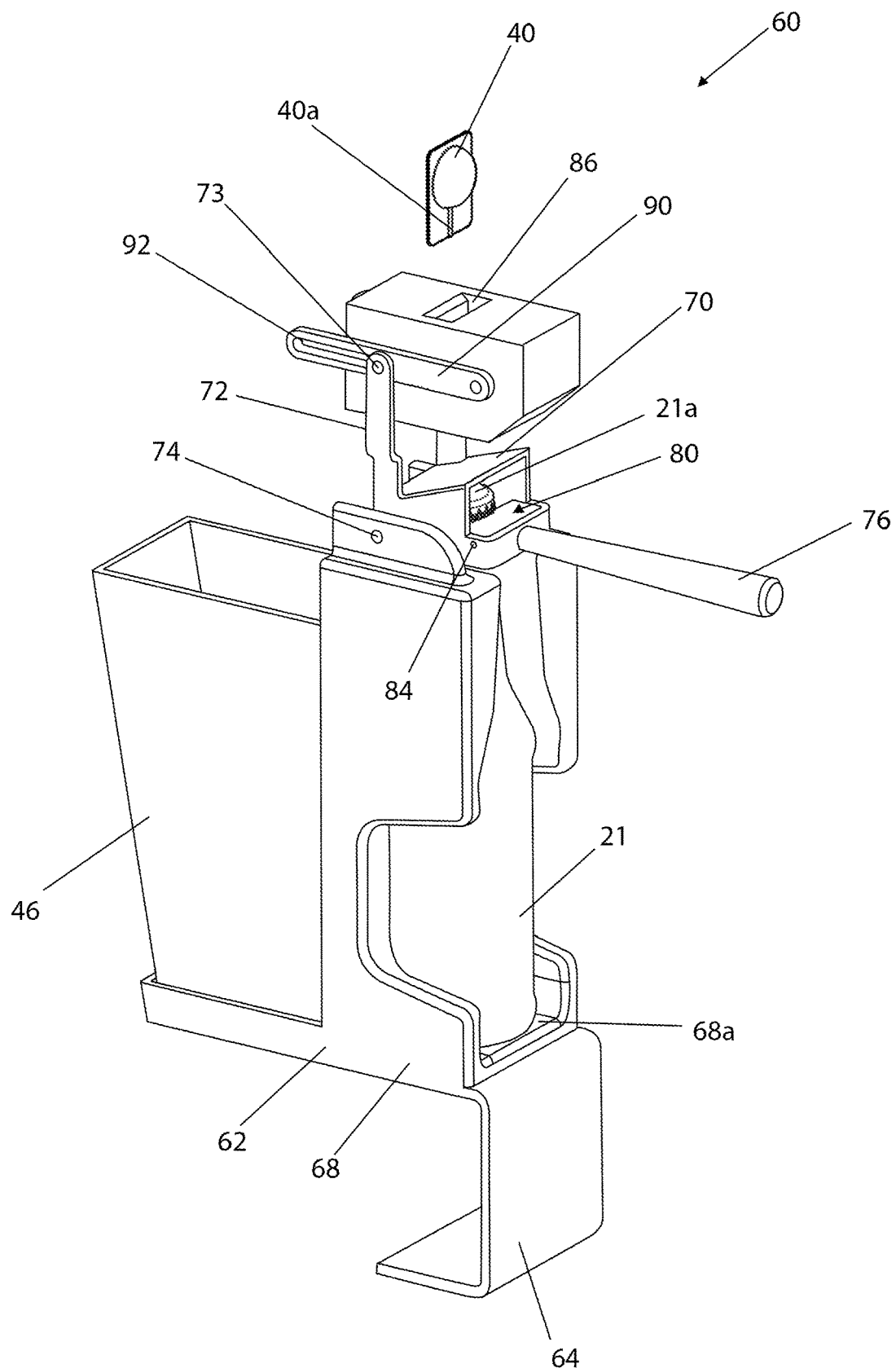
FIG. 9a is a diagrammatic perspective view of a second embodiment of an additive dispensing apparatus in which a container containing a liquid has been inserted into a container holder.
Figure 9B:
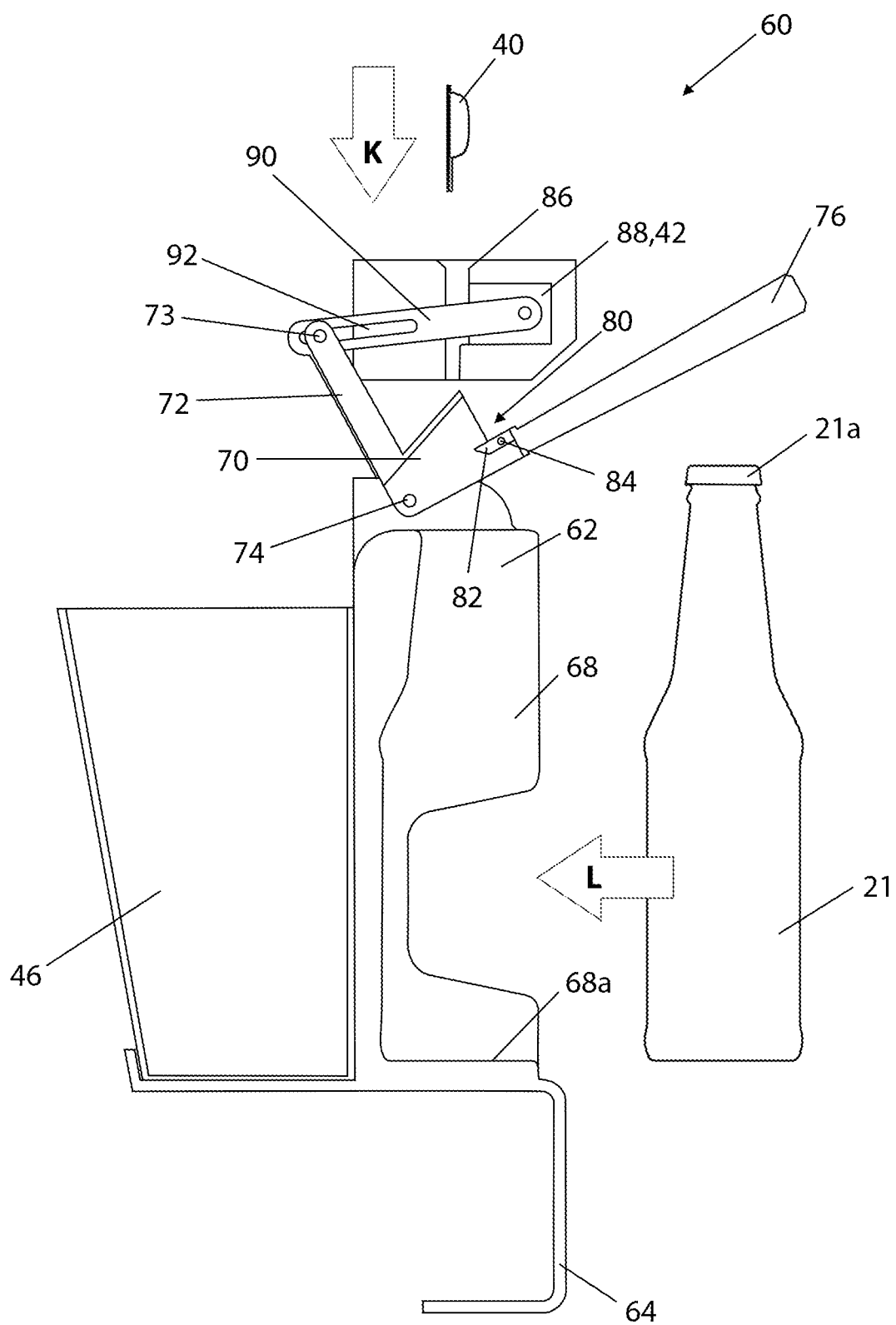
FIG. 9b is a diagrammatic side view of the apparatus of FIG. 9a prior to insertion of the container.
Figure 10:
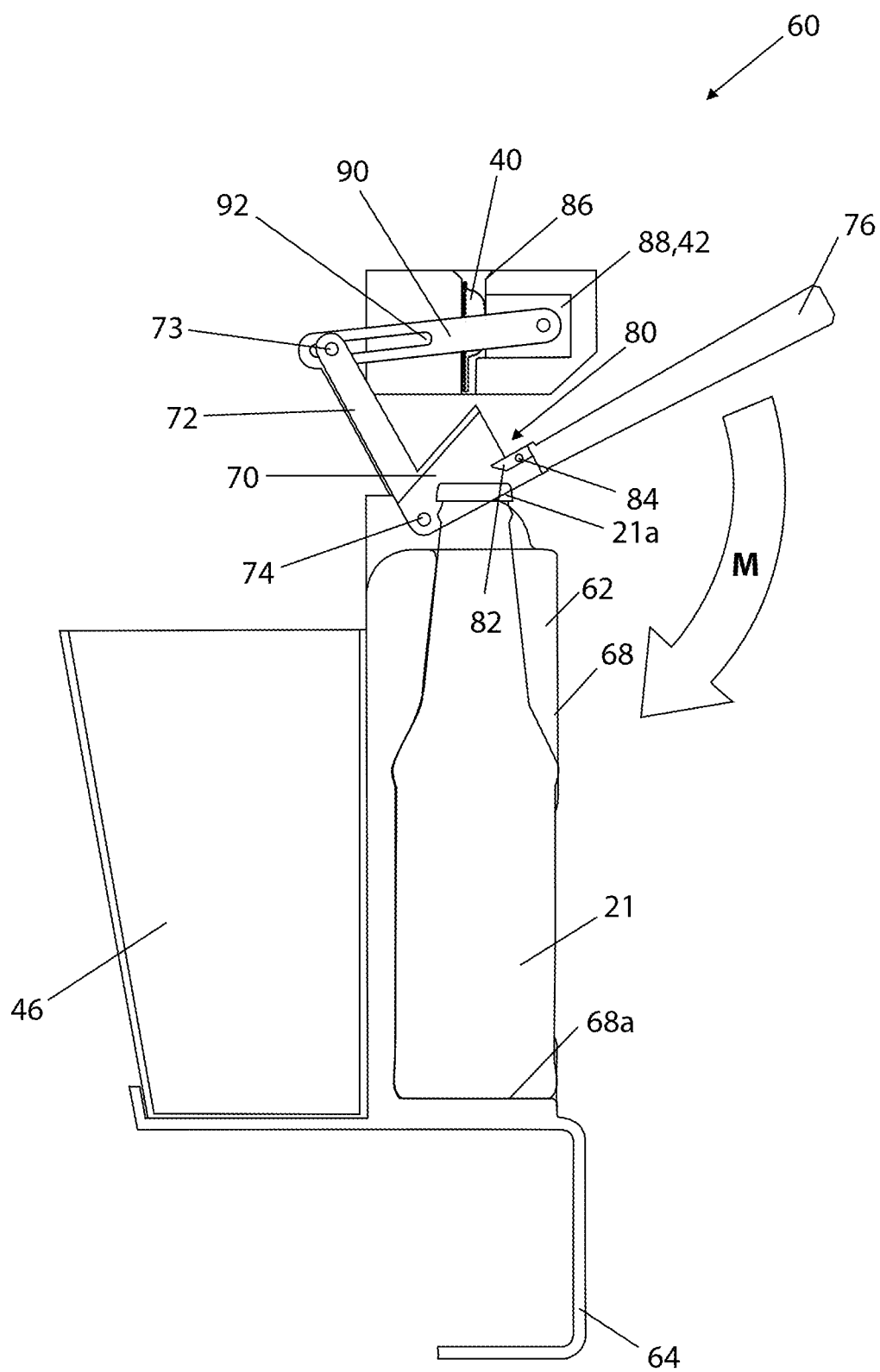
FIG. 10 is a view similar to FIG. 9b, with the container inserted in the container holder.
Figure 11:
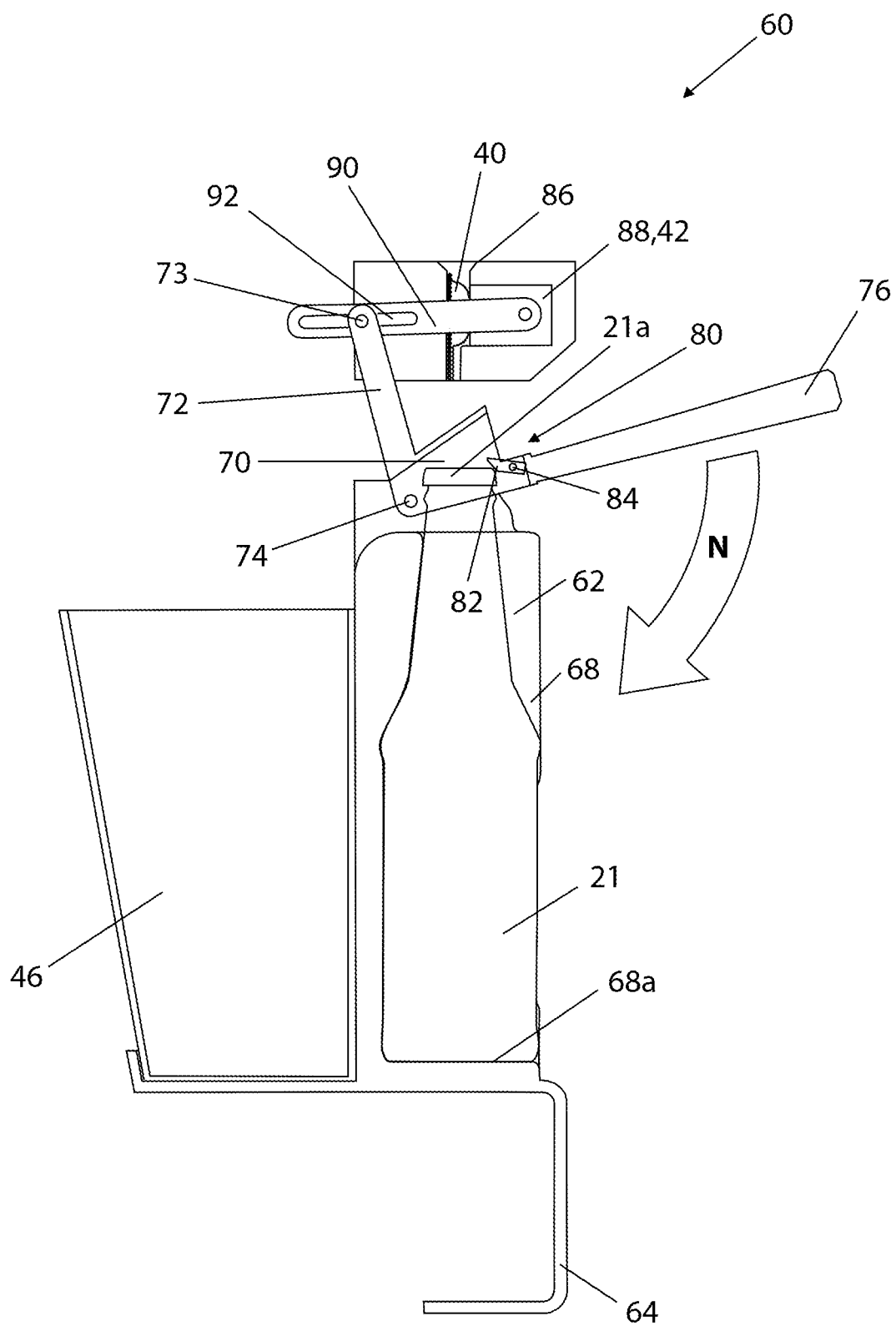
FIGS. 11 and 12 illustrate the movement of an operating lever from a first position shown in FIG. 10 to a second position shown in FIG. 12.
Figure 12:
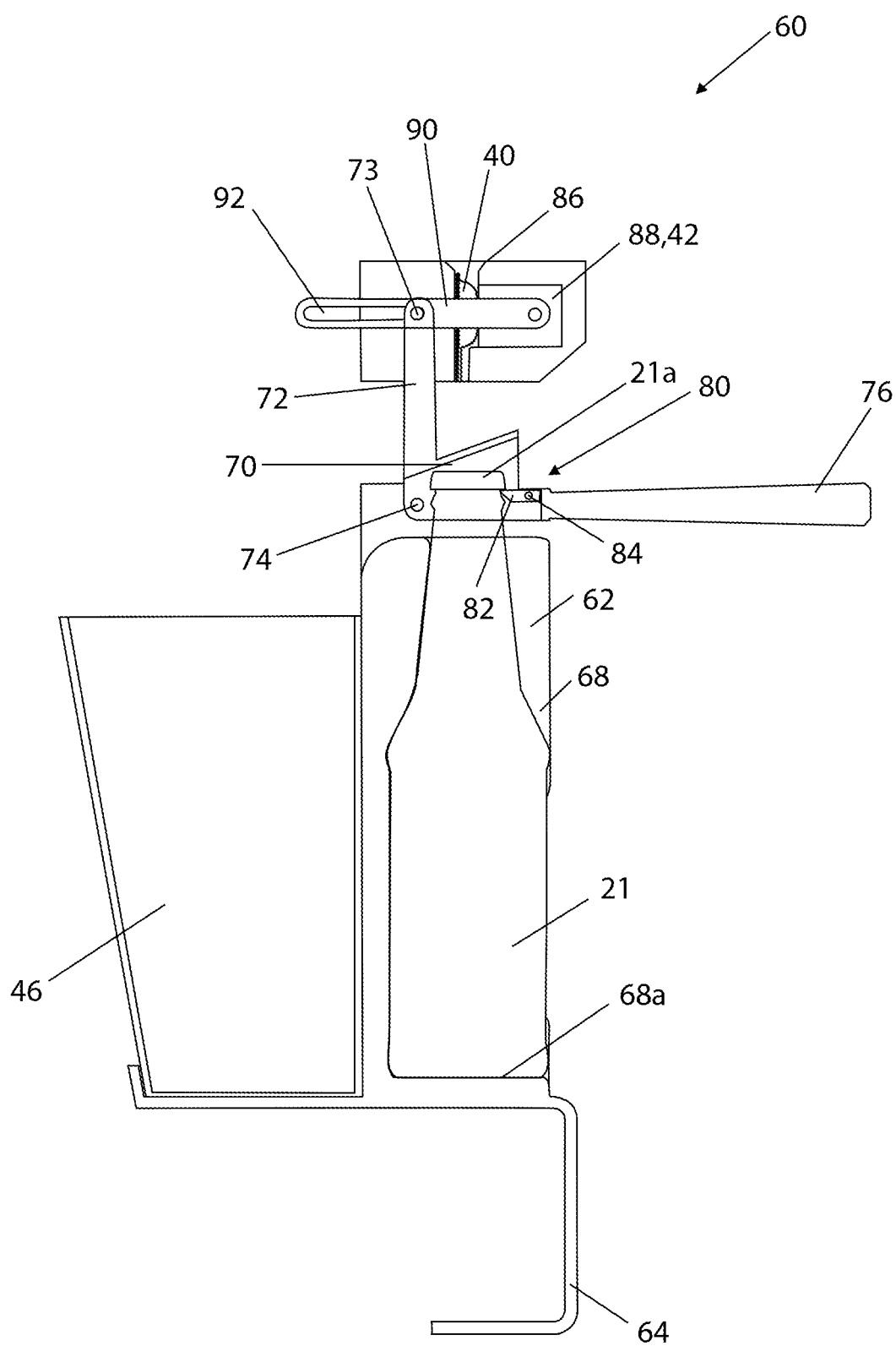

The apparatus 60 is shown in FIG. 10 with the operating lever 70 in a first position following insertion of a bottle 21 containing a beverage into the bottle holder 68. In order to operate the apparatus 60, a user applies a downward force to the handle 76, as depicted by arrows M and N in FIGS. 10 and 11. This rotates the handle 76 in a clockwise direction as viewed in the figures about the pivotal mounting 74. During the clockwise rotation of the handle 76, the spring-biased pawl 82 is urged against the bias of its spring in a clockwise direction as viewed in the figures about the pivotal mounting 84 (FIG. 11), before it is biased by its spring into the position shown in FIG. 12 to engage the lower rim of the crown cap 21*a*. During this initial movement of the handle 76 in which the operating lever 70 is moved by a user from the first position shown in FIG. 10 to a second position shown in FIG. 12, the pin 73 mounted at the end of the lever arm 72 slides freely in the elongate track 92 in the crank arm 90 from a first end of the track 90 as shown in FIGS. 9 and 10 to a second end of the track 90 as shown in FIG. 12.

Figure 13:
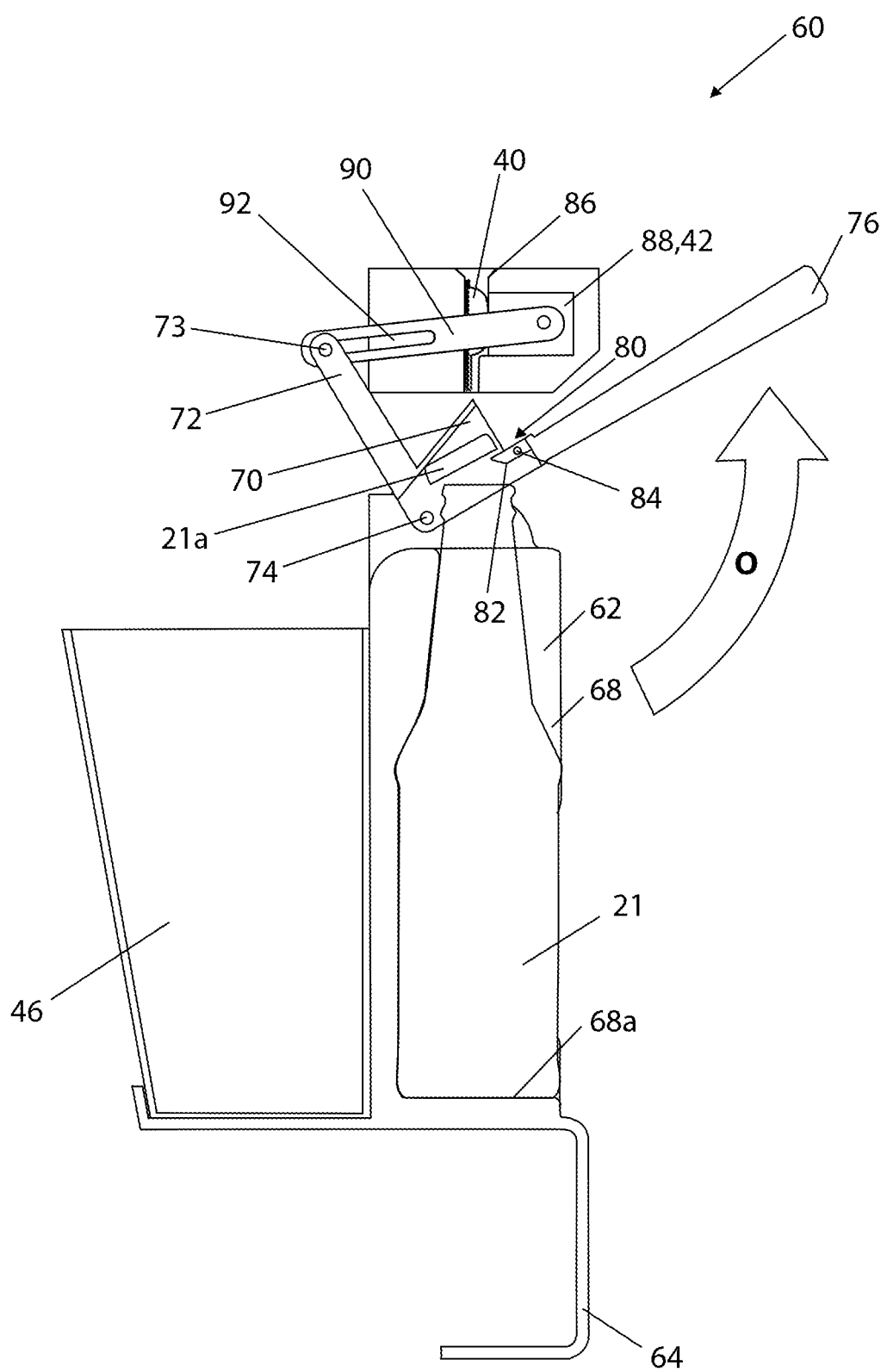
FIGS. 13 and 14 illustrate the movement of the operating lever from the second position shown in FIG. 12 to a third position shown in FIG. 14.
Figure 14:
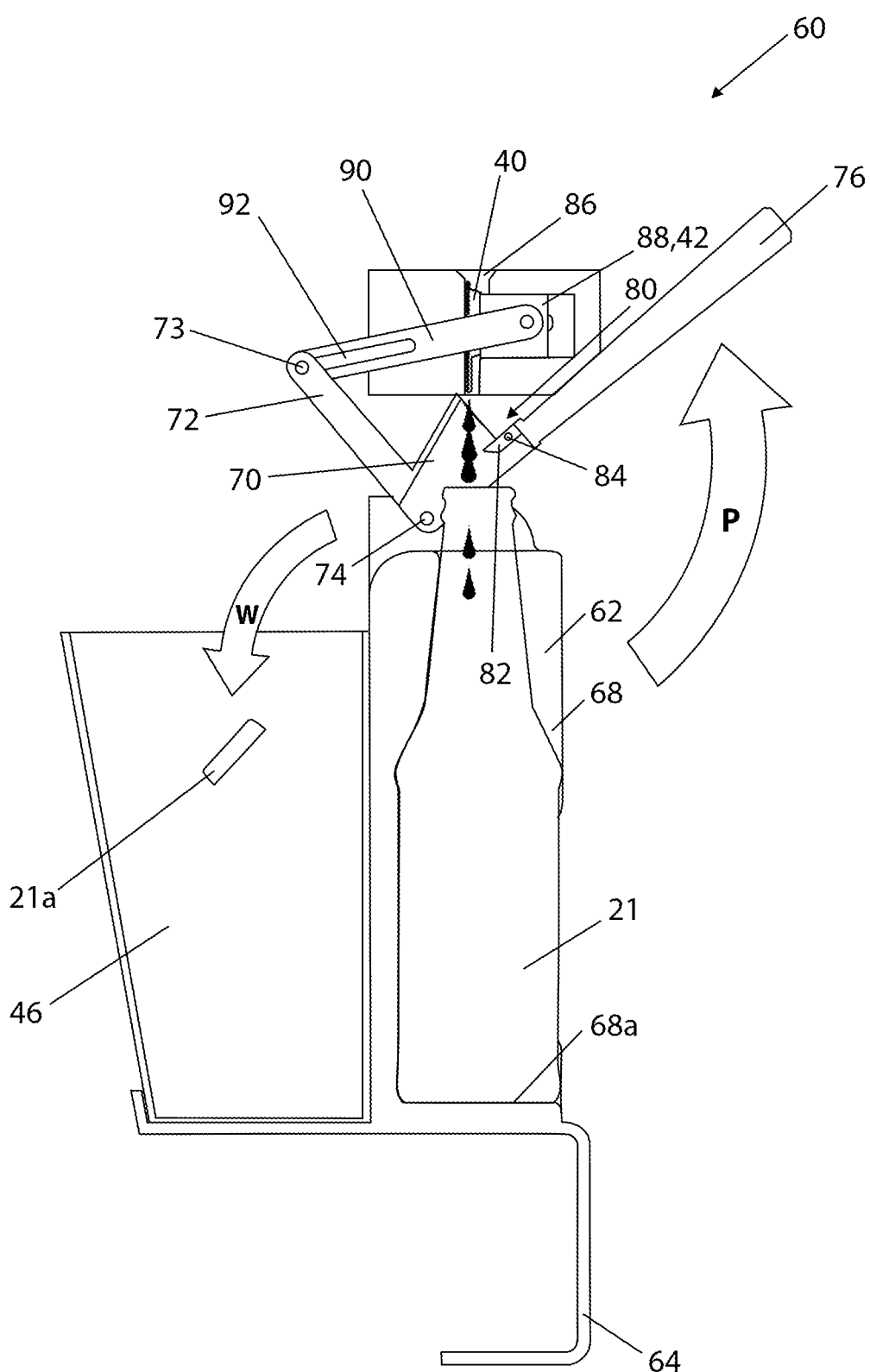

The handle 76 is then moved upwardly by the user (arrow O, FIG. 13) to rotate the operating lever 70 in an anti-clockwise direction as viewed in the figures about the pivotal mounting 74. During this anti-clockwise rotation of the operating lever 70, a removal force is applied by the bottle opener 80, and specifically by the pawl 82, to the lower rim of the crown cap 21*a* thereby removing the crown cap 21*a* from the bottle 21 as best seen in FIGS. 13 and 14. The apparatus 60 includes a bin 46 removably mounted on the support structure 62 and the cap 21*a* is ejected into the bin 46 following removal from the bottle 21, as depicted by arrow W in FIG. 14.

The upward movement of the handle 76 by the user causes the pin 73 mounted at the end of the lever arm 72 to slide along the elongate track 92 until it reaches the first end of the elongate track 92 as shown in FIG. 13. Continued upward movement of the handle 76 by the user (arrow P, FIG. 14) moves the operating lever 70 to a third position shown in FIG. 14. This urges the crank arm 90, and hence the piston 88, towards the capsule 40 so that the piston 88 applies a compressive force to the capsule 40 to crush, and thereby rupture, the capsule 40.

In the same manner described above with respect to the embodiment of FIGS. 1 to 8, the capsule holder 86 and capsule 40 are arranged so that the capsule 40 is oriented with the outlet channel 40*a* pointing towards the open top of the bottle 21. Consequently, when the capsule 40 is ruptured by the piston 88, the additive is dispensed from the capsule 40 by jetting directly into the bottle 21, as shown diagrammatically in FIG. 14.

Figure 16:
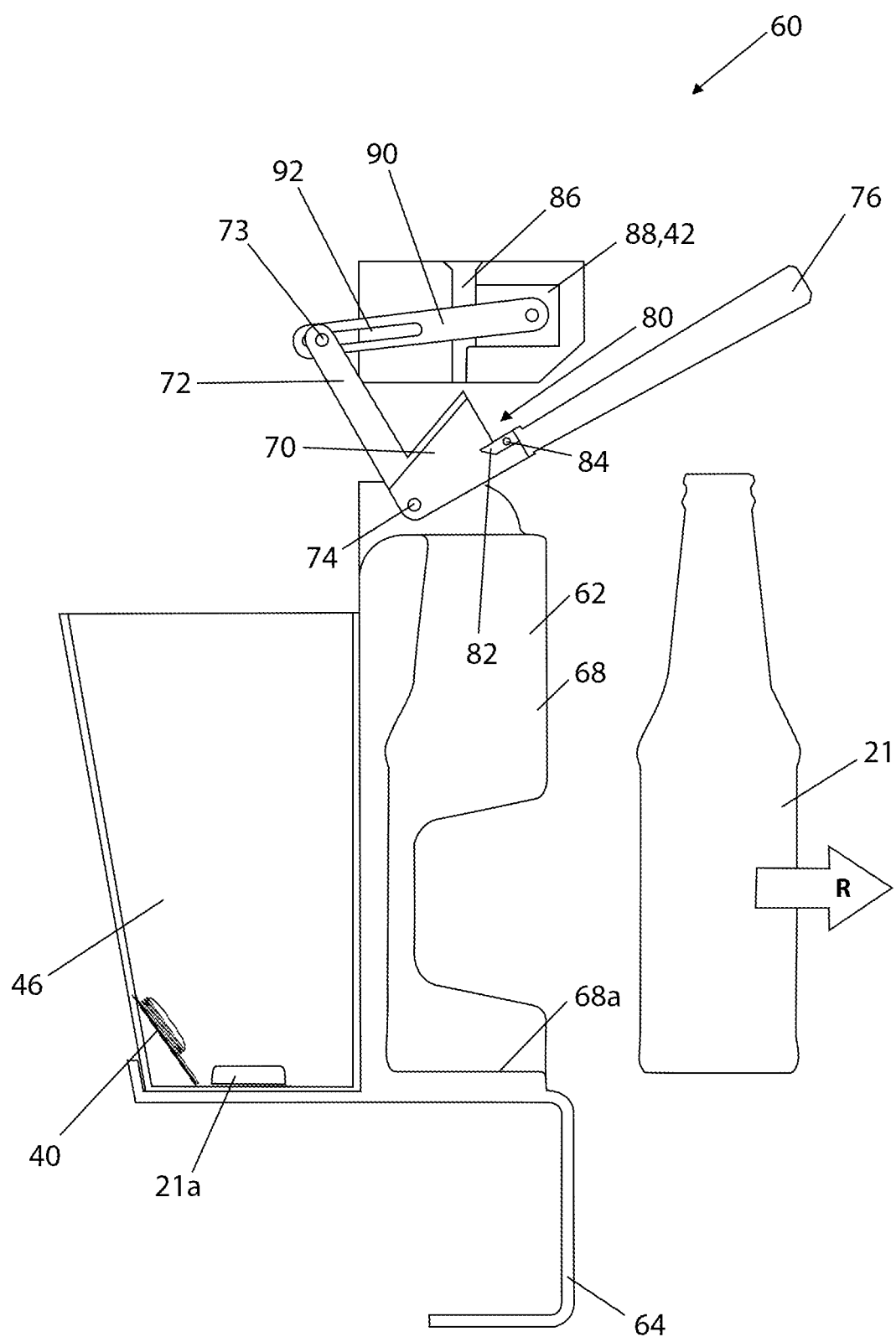

After the additive has been dispensed from the capsule 40 into the bottle 21, the operating lever 70 is biased, for example by a spring (not shown), from the third position shown in FIG. 14 towards the first position shown in FIG. 16

Figure 15:
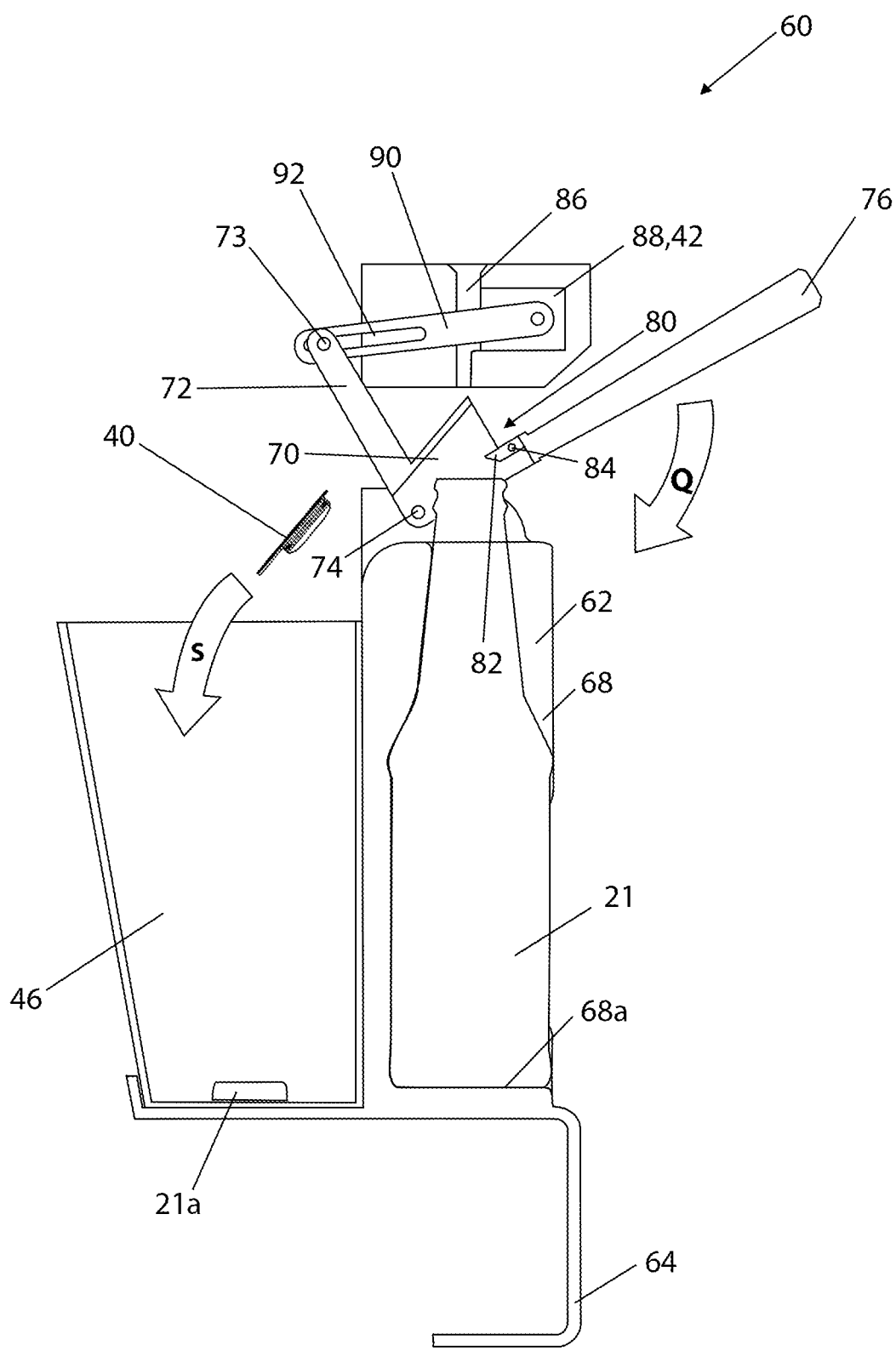
FIGS. 15 and 16 illustrate the return movement of the operating lever from the third position shown in FIG. 14 to the first position shown in FIGS. 15 and 16 to allow removal of the container from the container holder.

(arrow Q, FIG. 15). During movement of the operating lever 70 from the third position to the first position, the crank arm 90 and piston 88 are moved away from the capsule holder 86 to the position shown in FIG. 15. This releases the used (compressed) capsule 40 from the capsule holder 86 and the used capsule 40 is ejected into the bin 46 as depicted by arrow S in FIG. 15. Finally, once the operating lever 70 has returned to the first position shown in FIG. 16, the bottle 21 containing the beverage and additive is removed from the bottle holder 68 for consumption, as depicted by arrow R in FIG. 16.

Referring now to FIGS. 17 to 23, there is shown a third embodiment of an additive dispensing apparatus 100. The additive dispensing apparatus 100 has some similarities with the additive dispensing apparatus 20 illustrated in FIGS. 1 to 8 and corresponding components are identified using corresponding reference numerals.

The apparatus 100 comprises a support structure 102 having a horizontal base member 104 dimensioned for location on a counter top and two upwardly extending support members 106. A container holder in the form of a bottle holder 108 is rotatably mounted on the support members 106 by pivotal mountings 110 and is movable between a first position shown in FIGS. 17a and 17b (in which an inserted bottle 21 is in a substantially upright vertical position) and a second position shown in FIG. 21 (in which the bottle 21 is disposed at an angle to the vertical). The bottle holder 108 includes support means in the form of a support member 108a for supporting the base of a bottled beverage 21. The bottle holder 108 further includes an integrally formed upwardly projecting user-operable handle 112. A pair of springs 114 is provided to bias the bottle holder 108 into the first position. Each spring 114 is attached at one end to an upper end of one of the support members 106 and at the other end to a respective arm 116 which projects rearward and upward from the bottle holder 108.

The apparatus 100 includes an actuating head 118. The actuating head 118 is mounted on the support members 106 by a pair of link members 120 which control the motion of the actuating head 118. More particularly, as the bottle holder 108 is moved from the first position shown in FIGS. 17a and 17b towards the second position shown in FIG. 21, the link members 120 initially impart a substantially linear motion to the actuating head 118, causing it to slide downwardly over the bottle 21 from an upper position shown in FIG. 18 to a lower position shown in FIG. 19 in which a cradle 122 engages a shoulder 21b of the bottle 21.

The actuating head 118 includes a container opener in the form of a bottle opener 123 for engaging a crown cap 21a fitted to the bottle 21. The bottle opener 123 comprises a removal claw 124 which is adapted to engage an underside of a lower rim of the crown cap 21a when the actuating head 118 has moved to the lower position shown in FIG. 19.

The apparatus 100 includes a capsule holder 126 which is mounted on the actuating head 118 by a pair of control links 128. A capsule 40 containing a desired additive, such as a flavouring substance, is inserted into the capsule holder 126 as depicted by arrow T in FIG. 17b either prior to, or after, insertion of the bottle 21 into the bottle holder 108 (arrow U). The capsule 40 is shown in FIG. 18 in the seated position inside the capsule holder 126 and is supported by a support surface 140.

The apparatus 100 includes a compression device 130 for applying a compressive force to the capsule 40. The compression device 130 comprises a compression block 132 and an associated cam 134 having a cam surface 134a. The compression block 132 and cam 134 are biased to an inactive position shown in FIGS. 17 to 20, 22 and 23 by springs 138. The compression block 132 and cam 134 are movable from the inactive position to an active position shown in FIG. 21 in which the compression block 132 urges the capsule 40 against the support surface 140 and thereby applies a compressive force to the capsule 40 to rupture it and thus eject the additive into the bottle 21.

Figure 17A:
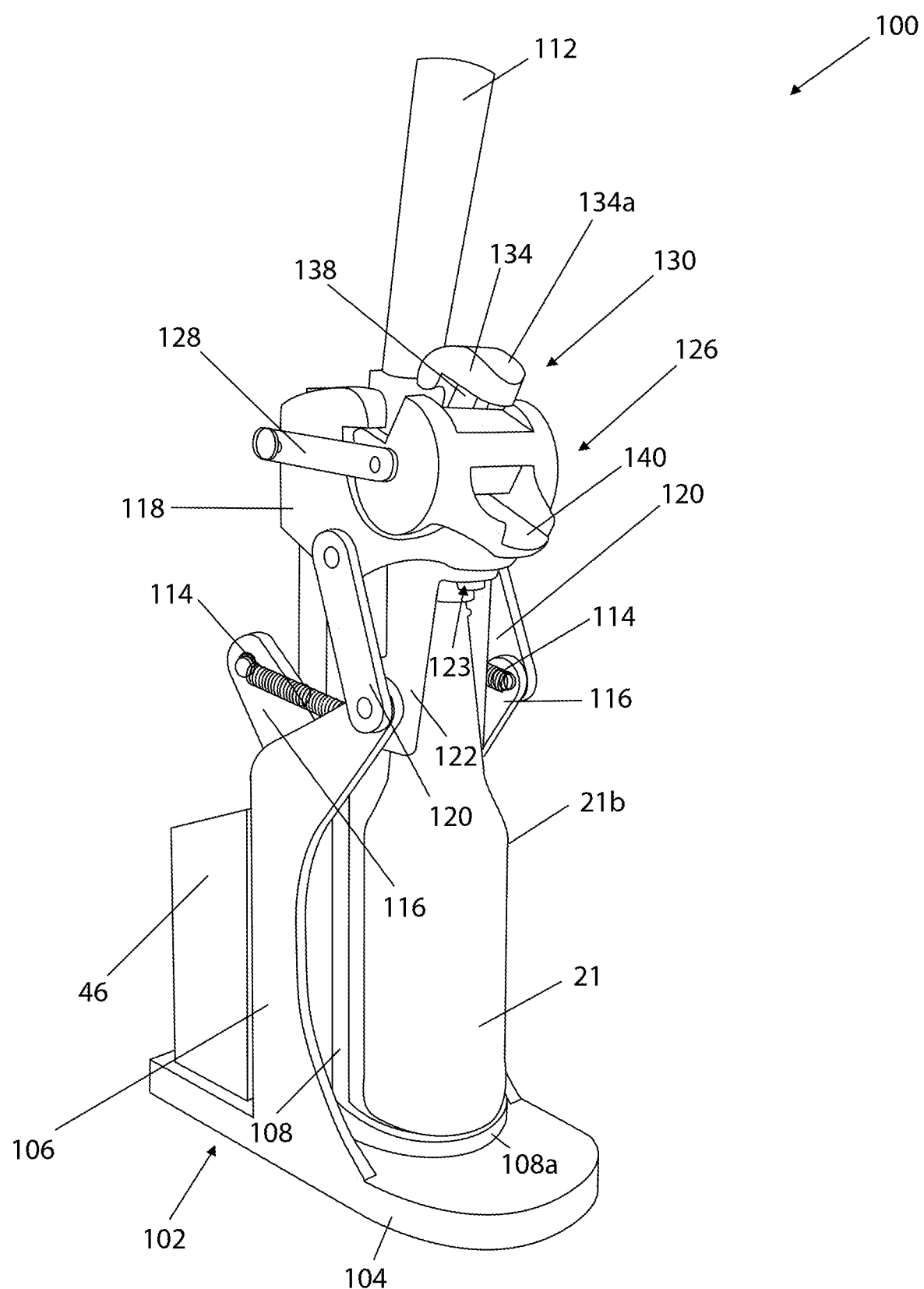
FIG. 17a is a diagrammatic perspective view of a third embodiment of an additive dispensing apparatus in which a container containing a liquid has been inserted into a container holder.
Figure 17B:
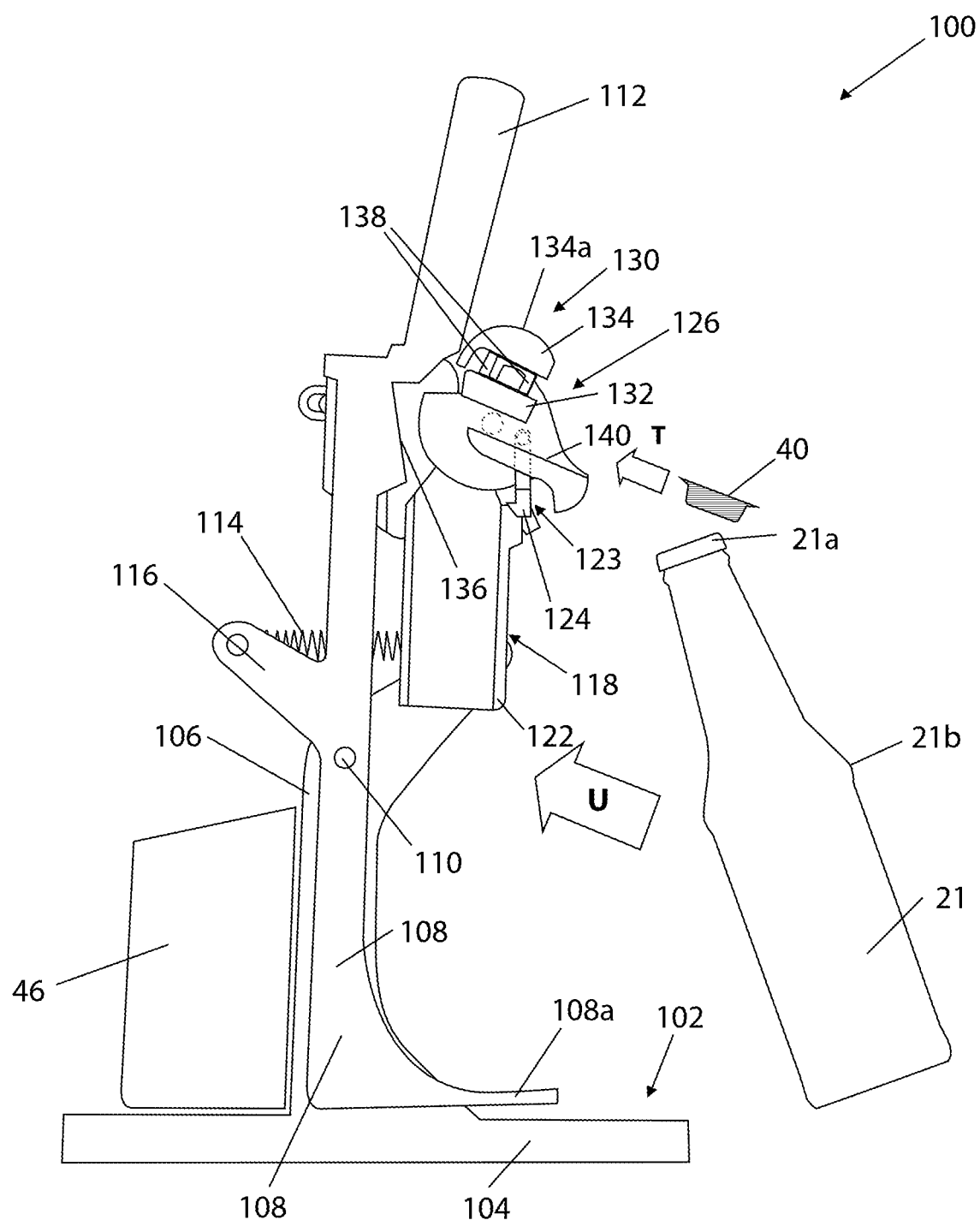
FIG. 17b is a diagrammatic side view of the apparatus of FIG. 17a prior to insertion of the container.
Figure 18:
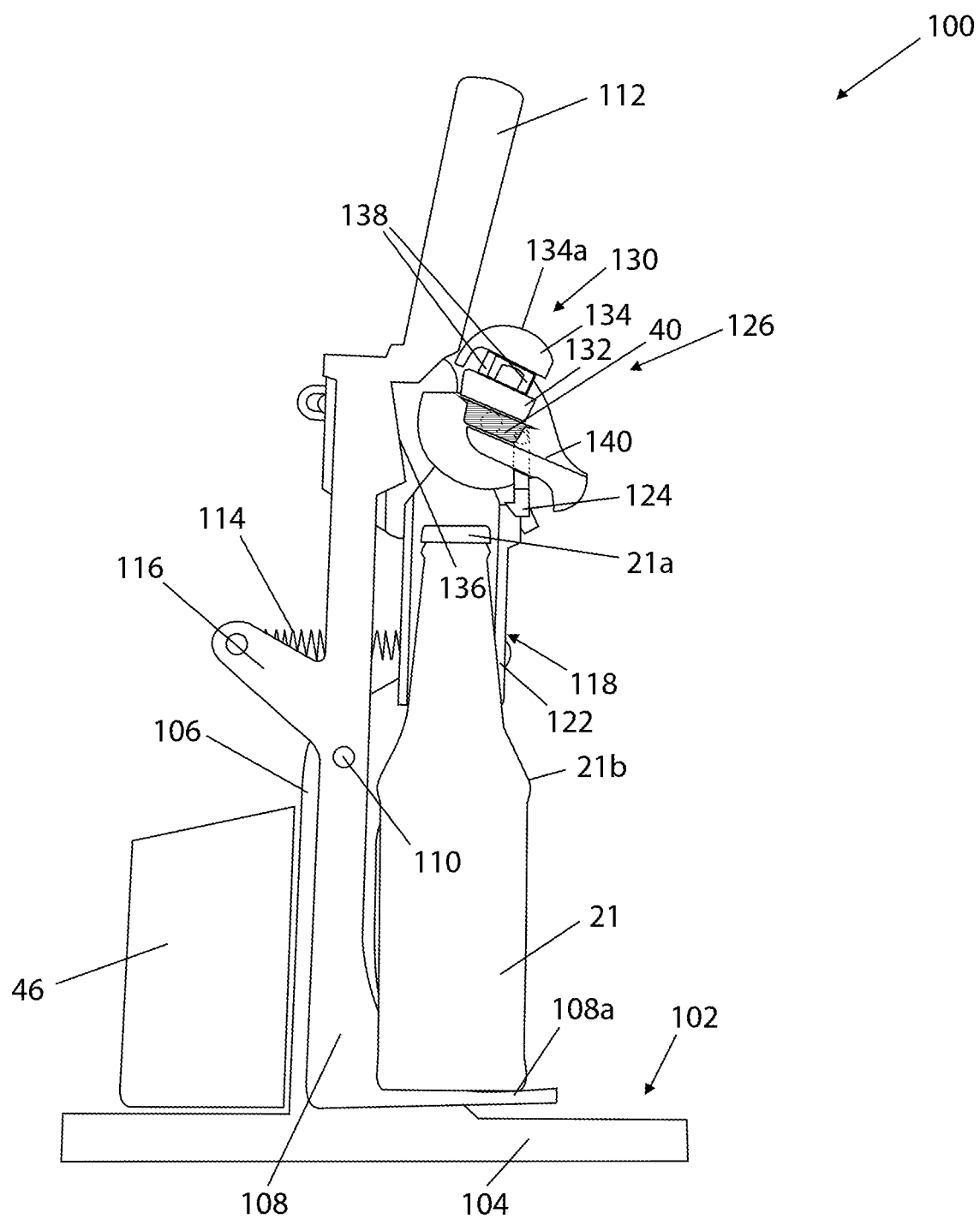
FIG. 18 is a is a view similar to FIG. 17b, with the container inserted in the container holder.
Figure 19:
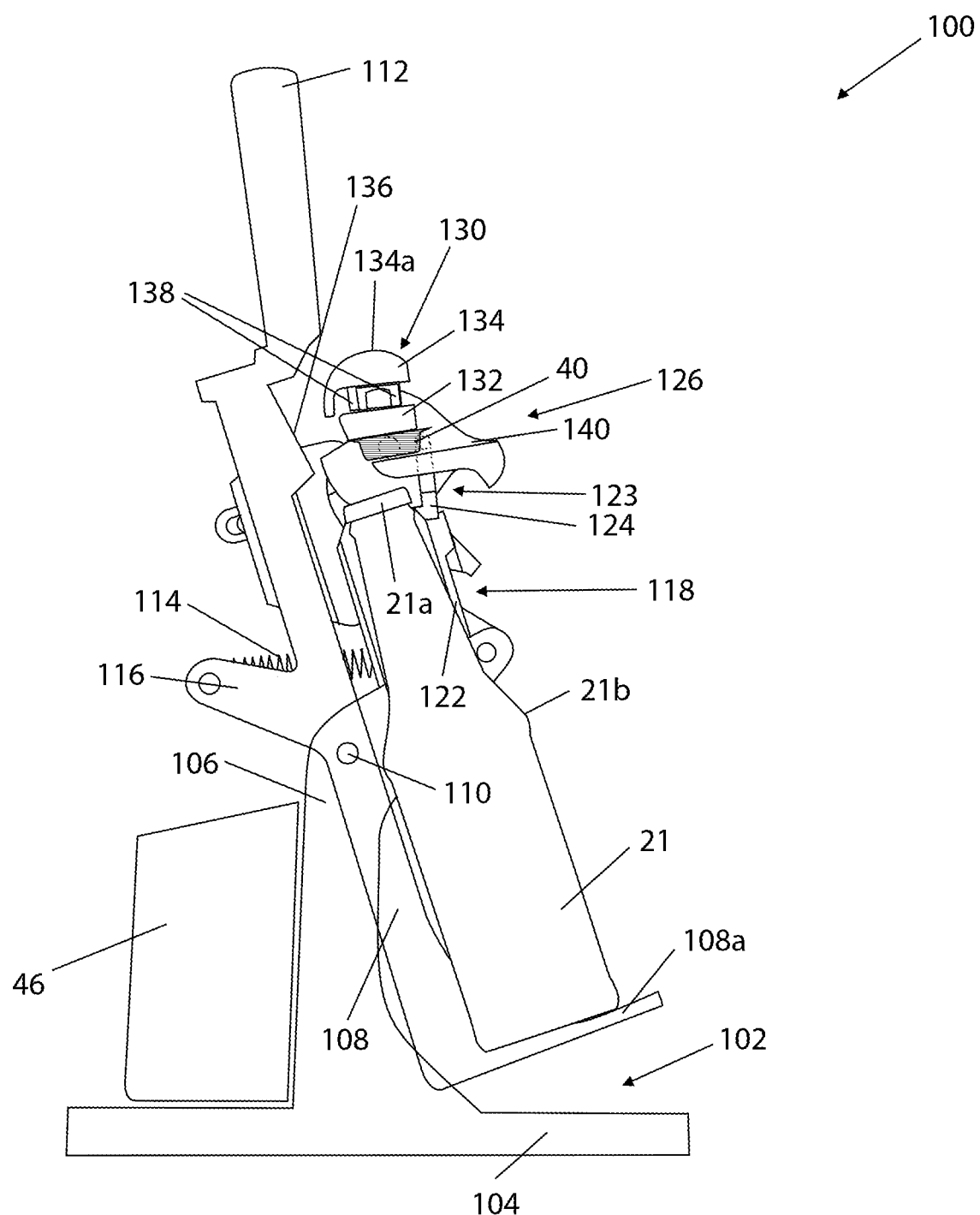
FIGS. 19 to 21 illustrate the movement of the container holder from a first position shown in FIGS. 17a, 17b and 18 to a second position shown in FIG. 21.
Figure 20:
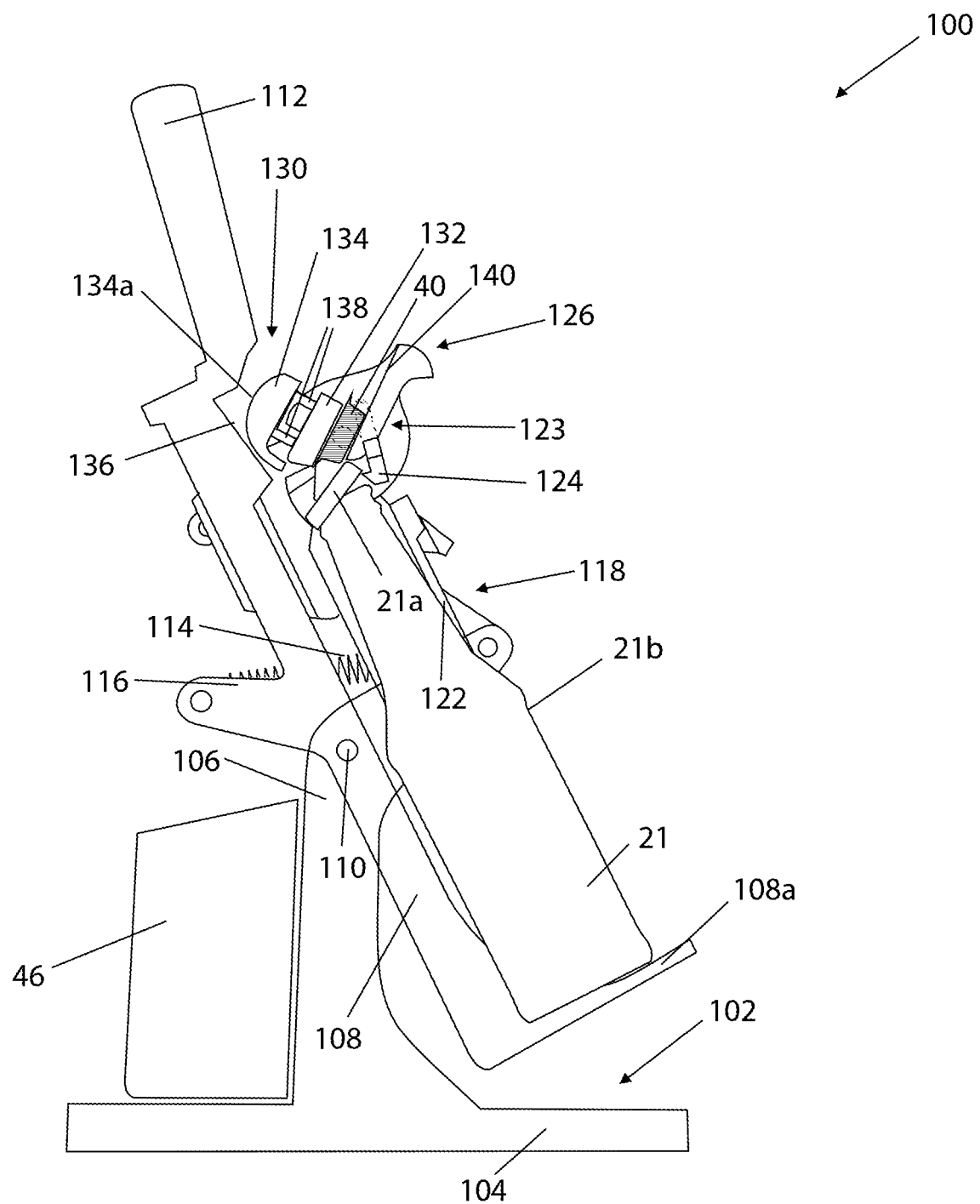

In more detail, and as noted above, a user initially inserts a bottled beverage 21 into the bottle holder 108 as depicted by arrow U in FIG. 17b and, either before or after insertion of the bottle 21, the user inserts a capsule 40 into the capsule holder 126 as depicted by arrow T in the same figure. The user then operates the apparatus 100 by applying a force to the handle 112 so that the user pushes the handle 112 away from them. This causes the bottle holder 108 to rotate in an anti-clockwise direction, as viewed in FIGS. 18 to 21, about the pivotal mountings 110. During the initial rotation of the bottle holder 108, as noted above the actuating head 118 slides downwardly over the bottle 21 from the upper position shown in FIG. 18 to the lower position shown in FIG. 19 in which the cradle 122 firmly engages the shoulder 21b of the bottle 21. At the same time, the removal claw 124 engages the underside of the lower rim of the crown cap 21a.

As the bottle holder 108 continues to rotate about the pivotal mountings 110 and to move from the first position towards the second position, the removal claw 124 applies a removal force to the crown cap 21a of the bottle 21 to remove the cap 21a. Once removed, the cap 21a is ejected into the removably mounted bin 46 as shown in FIG. 21.

During movement of the bottle holder 108 from the first position towards the second position, the compression device 130 also rotates relative to the actuating head 118 as best seen in FIGS. 18 to 21, the rotational movement being controlled by the control links 128. As the bottle holder 108 approaches the second position shown in FIG. 21, the cam surface 134a engages an actuating surface 136 formed at an upper end of the bottle holder 108. Because the movement of the capsule holder 126 is constrained by the control links 128, the contact force between the cam surface 134a and the actuating surface 136 urges the compression block 132 towards the support surface 140 against the bias of the springs 138, thus applying a compressive force to the capsule 40 to crush, and thereby rupture, the capsule 40.

In the same manner described above with respect to the embodiment of FIGS. 1 to 8, the capsule holder 126 and capsule 40 are arranged so that the capsule 40 is oriented with the outlet channel 40a pointing towards the open top of the bottle 21 when the bottle holder 108 is in the second position. Consequently, when the capsule 40 is ruptured by the compression block 132, the additive is dispensed from the capsule 40 by jetting directly into the bottle 21, as shown diagrammatically in FIG. 21. It will be noted from FIG. 21 that the additive is dispensed into the bottle 21 when the bottle 21 is in a tilted position. This has been found to be particularly advantageous when the beverage contained in the bottle 21 is a carbonated beverage because it reduces foaming of the carbonated beverage and thereby reduces the likelihood of spillage and waste of the carbonated beverage as a result of excessive foaming. It is believed that foaming is reduced because there is a reduction in the nucleation rate when the additive is dispensed with the bottle 21 in a tilted position.

Figure 21:
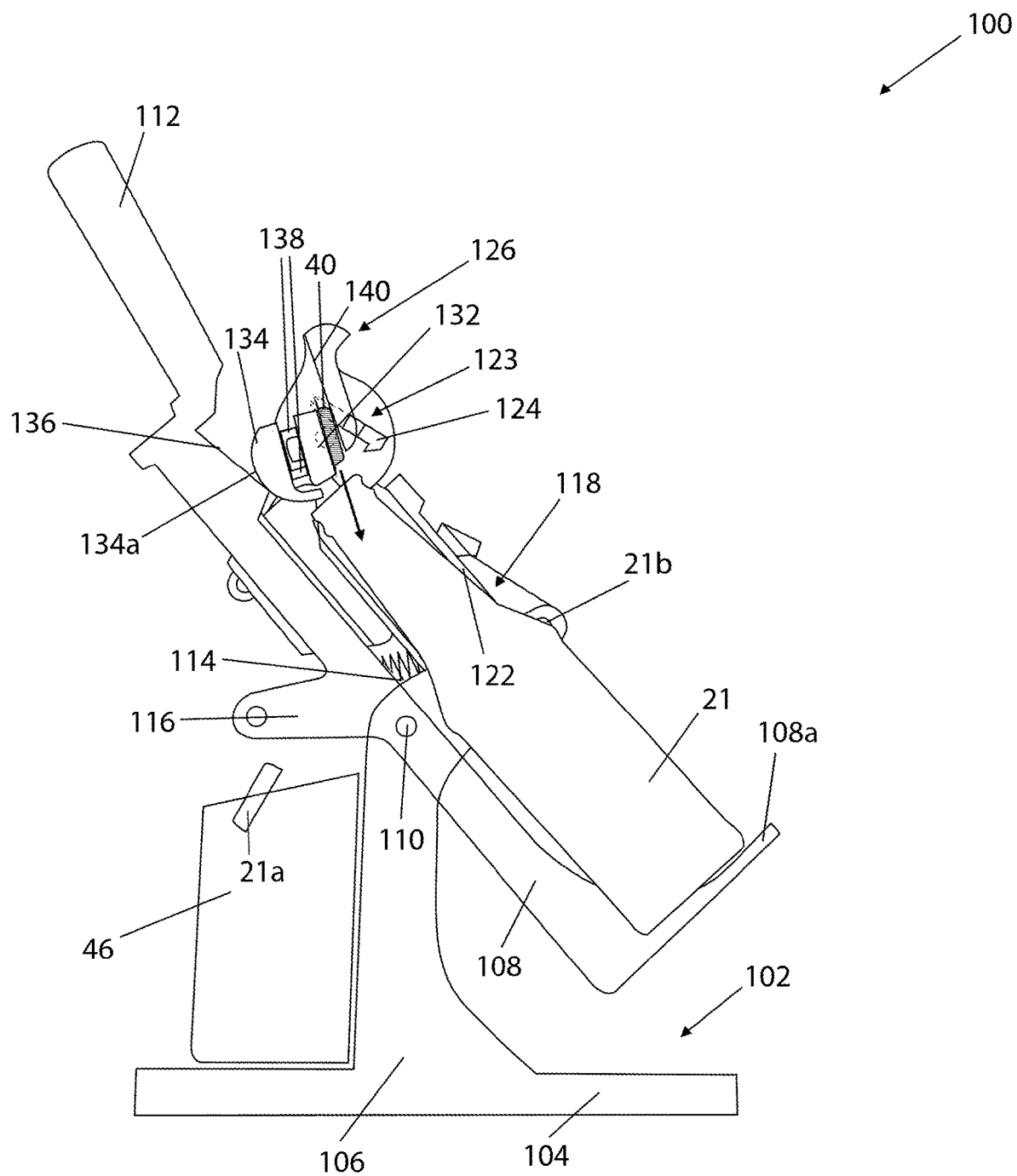
Figure 22:
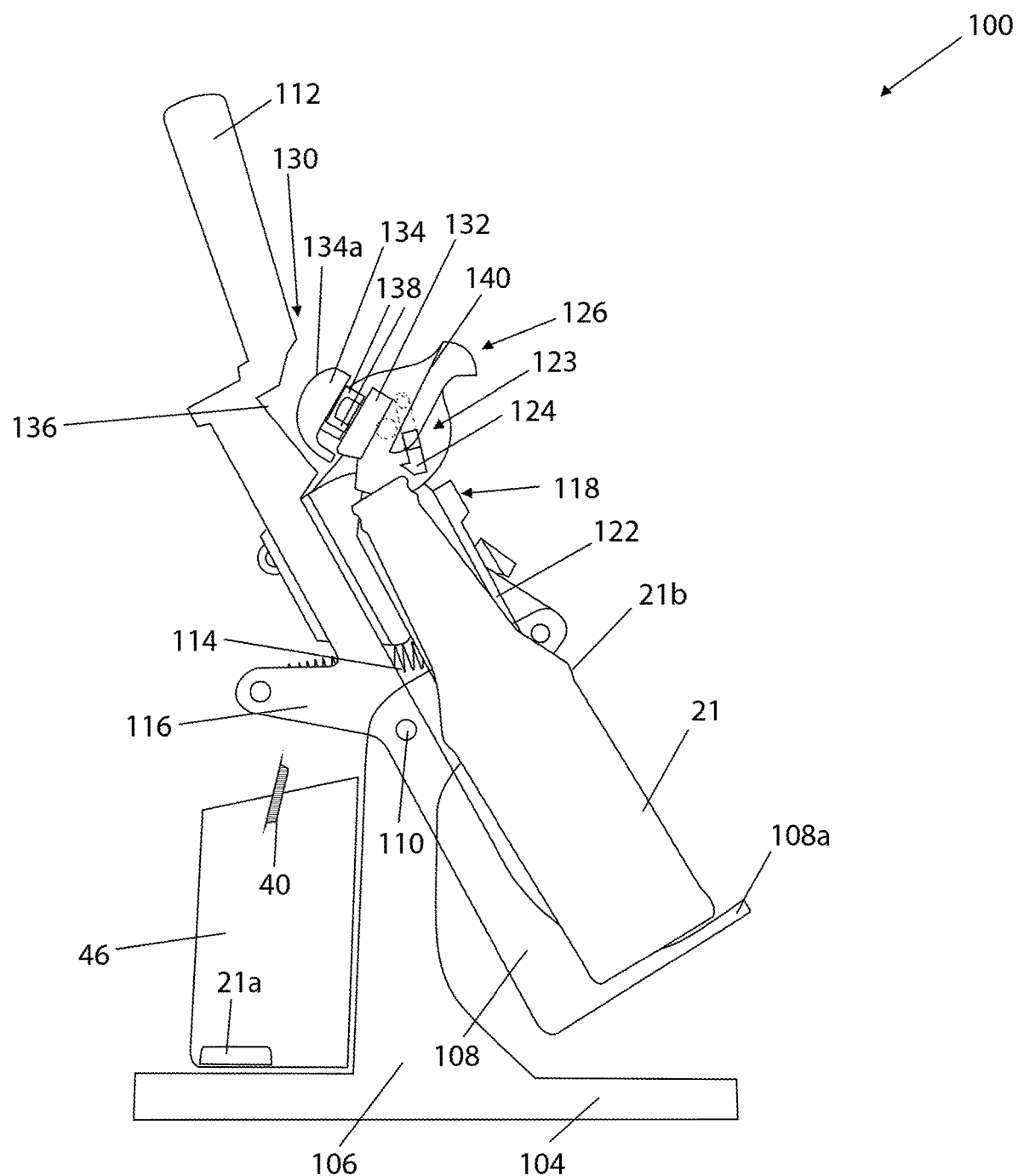
FIGS. 22 and 23 illustrate the return movement of the container holder from the second position shown in FIG. 21 to the first position shown in FIG. 23 to allow removal of the container from the container holder.
Figure 23:
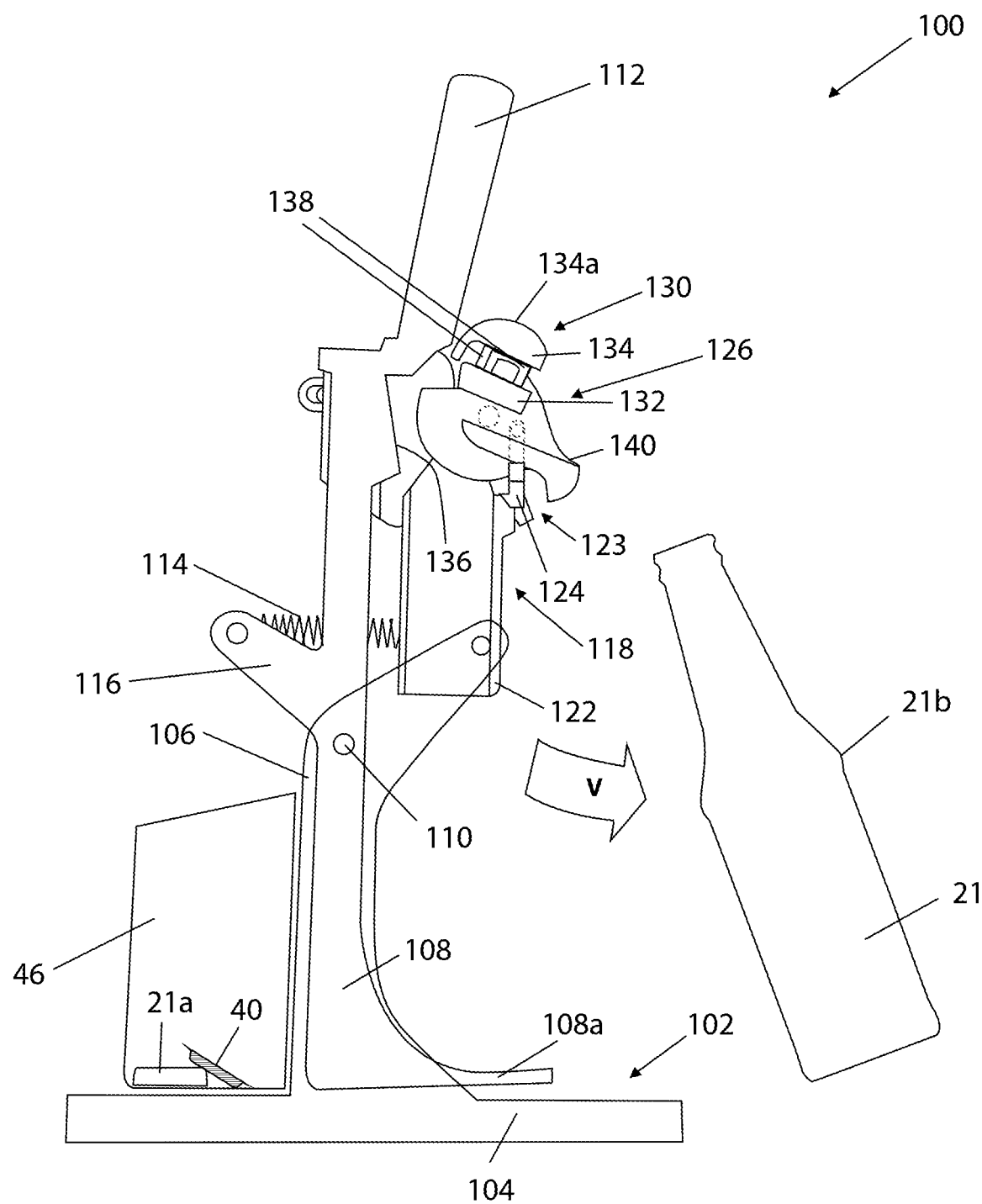

After the additive has been dispensed from the capsule 40 into the bottle 21, the bottle holder 108 is biased by the springs 114 from the second position shown in FIG. 21 towards the first position shown in FIG. 23. During rotational movement of the bottle holder 108 from the second position to the first position about the pivotal mountings 110 (in the clockwise direction as viewed in FIGS. 21 to 23), the contact between the cam surface 134a and the actuating surface 136 is released, thereby allowing the springs 138 to urge the compression block 132 away from the support surface 140. This releases the used (compressed) capsule 40 from the capsule holder 126 and the used capsule 40 is ejected into the bin 46 as shown FIG. 22. At the same time, the actuating head 118 moves from the lower position to the upper position thereby moving the cradle 122 in an upward direction to release the contact between the cradle 122 and the shoulder 21b of the bottle 21. Finally, once the bottle holder 108 has returned to the first position shown in FIG. 23, the bottle 21 containing the beverage and additive is removed from the bottle holder 108 for consumption, as depicted by arrow V in FIG. 23.

Referring now to FIGS. 24 to 30, there is shown a fourth embodiment of an additive dispensing apparatus 150. The additive dispensing apparatus 150 has some similarities with the additive dispensing apparatus 100 illustrated in FIGS. 17 to 23 and corresponding components are identified using corresponding reference numerals.

The apparatus 150 comprises a support structure 152 having a horizontal base member 154 dimensioned for location on a counter top and two upwardly extending support members 156. A container holder in the form of a bottle holder 158 is rotatably mounted on the support members 156 by pivotal mountings 160 and is movable between a first position shown in FIGS. 24a, 24b and 25 (in which an inserted bottle 21 is in a substantially upright vertical position) and a second position shown in FIGS. 27 and 28 (in which the inserted bottle 21 is disposed at an angle to the vertical). The bottle holder 158 includes support means in the form of a support member 158a for supporting the base of a bottled beverage 21. The bottle holder 158 also includes a grip assembly 162 comprising first and second grip members 164a, 164b which are adapted to resiliently grip an upper portion of the bottle 21 to prevent rotational movement of the bottle 21. For example, the grip members 164a, 164b may be arranged so that the spacing between the grip members 164a, 164b is slightly less than the outer diameter of an upper region of the bottle 21 and the grip members 164a, 164b may comprise a resilient material which is capable of deforming to accommodate and grip the upper region of a bottle 21 inserted into the bottle holder 158.

The apparatus 150 includes a user-operable handle 166 which projects upwardly from a pair of spaced downwardly extending operating members 168. The operating members 168 are rotatably mounted at their lower ends on the support members 156 by the pivotal mountings 160. As will be described in further detail below, movement of the handle 166 by a user, and hence movement of the operating members 168 about the pivotal mountings 160, causes movement of the bottle holder 158 about the pivotal mountings 160 between the first and second positions.

The apparatus 150 includes a container opener in the form of a bottle opener 170 for engaging a screw cap 172 having an internal thread which is screw fitted onto the bottle 21. The bottle opener 170 comprises a removal arm 174 having formations 176, such as tooth formations, which are adapted to engage formations (visible only in FIGS. 24a and 24b) provided around the outer circumferential surface of the screw cap 172. As will be described in further detail below, the removal arm 174, which is static and which essentially acts as a gear rack, applies a removal force in the form of a removal torque to the screw cap 172 due to the cooperation between the tooth formations 176 and the formations on the screw cap 172 as the bottle holder 158 is moved from the first position towards the second position, thereby rotating the screw cap 172 and removing it from the bottle 21.

Figure 24A:
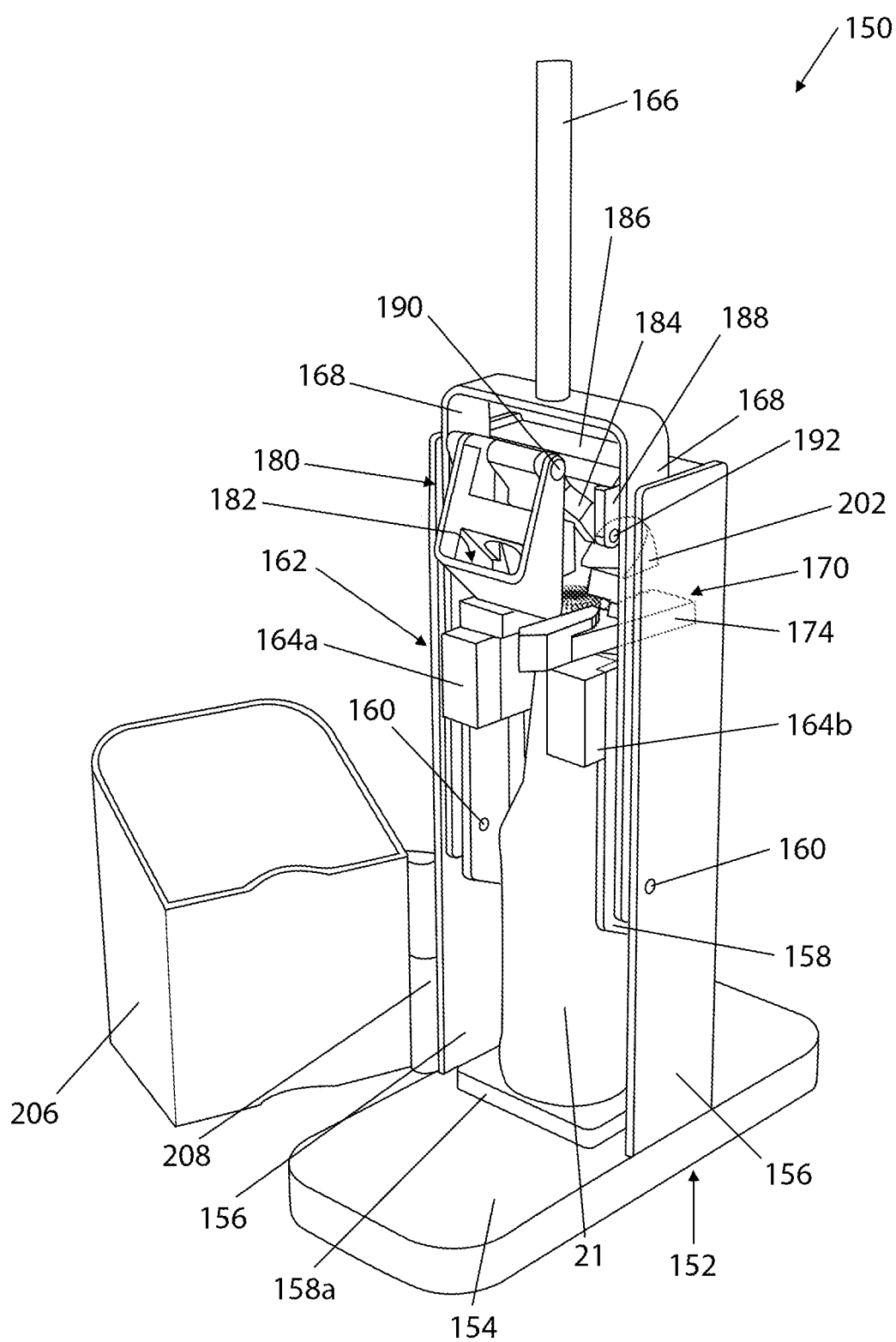
FIGS. 24a and 24b are diagrammatic perspective views of a fourth embodiment of an additive dispensing apparatus in which a container containing a liquid has been inserted into a container holder and showing a bin in open and closed positions.
Figure 24B:
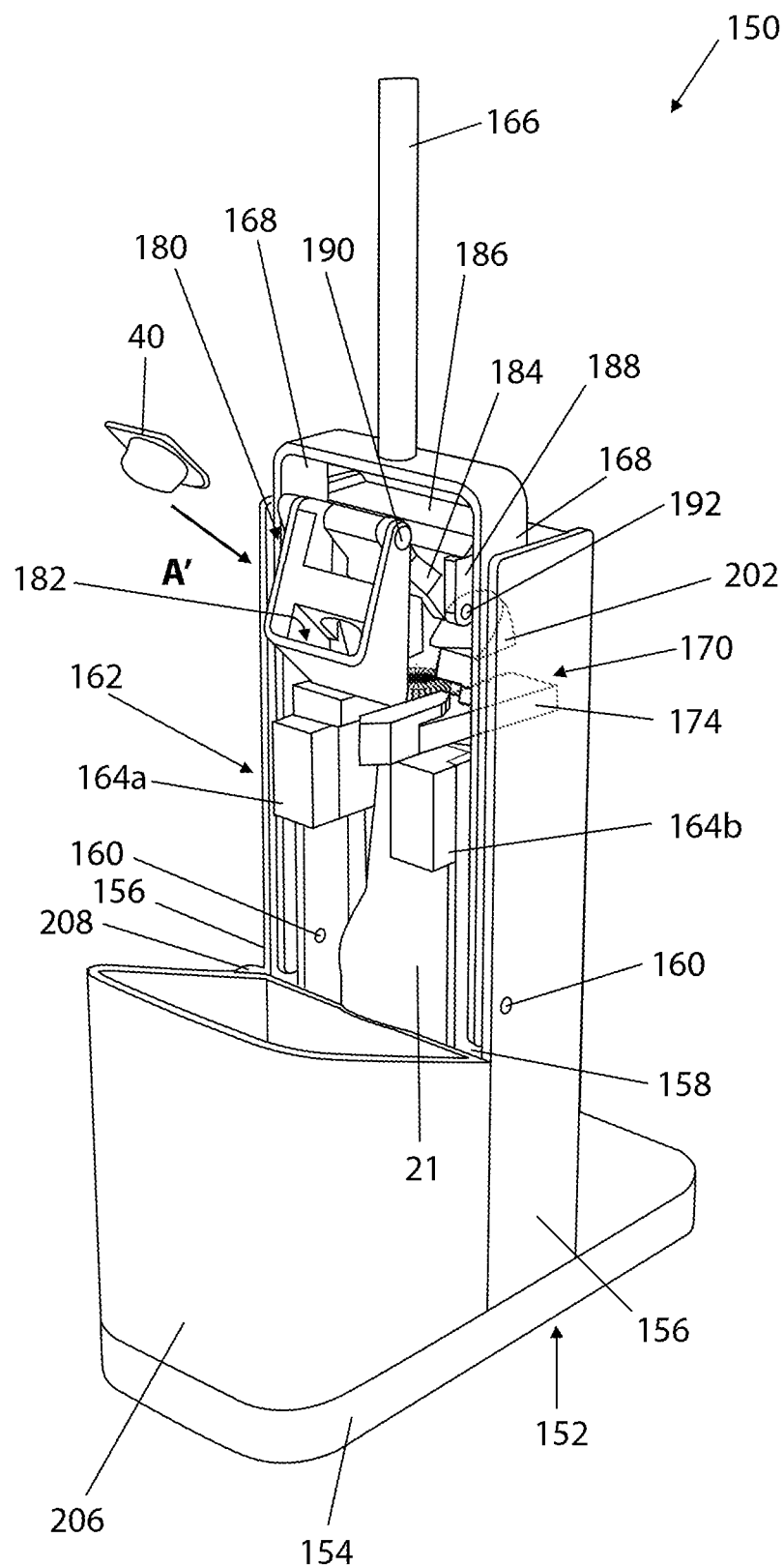
Figure 25:
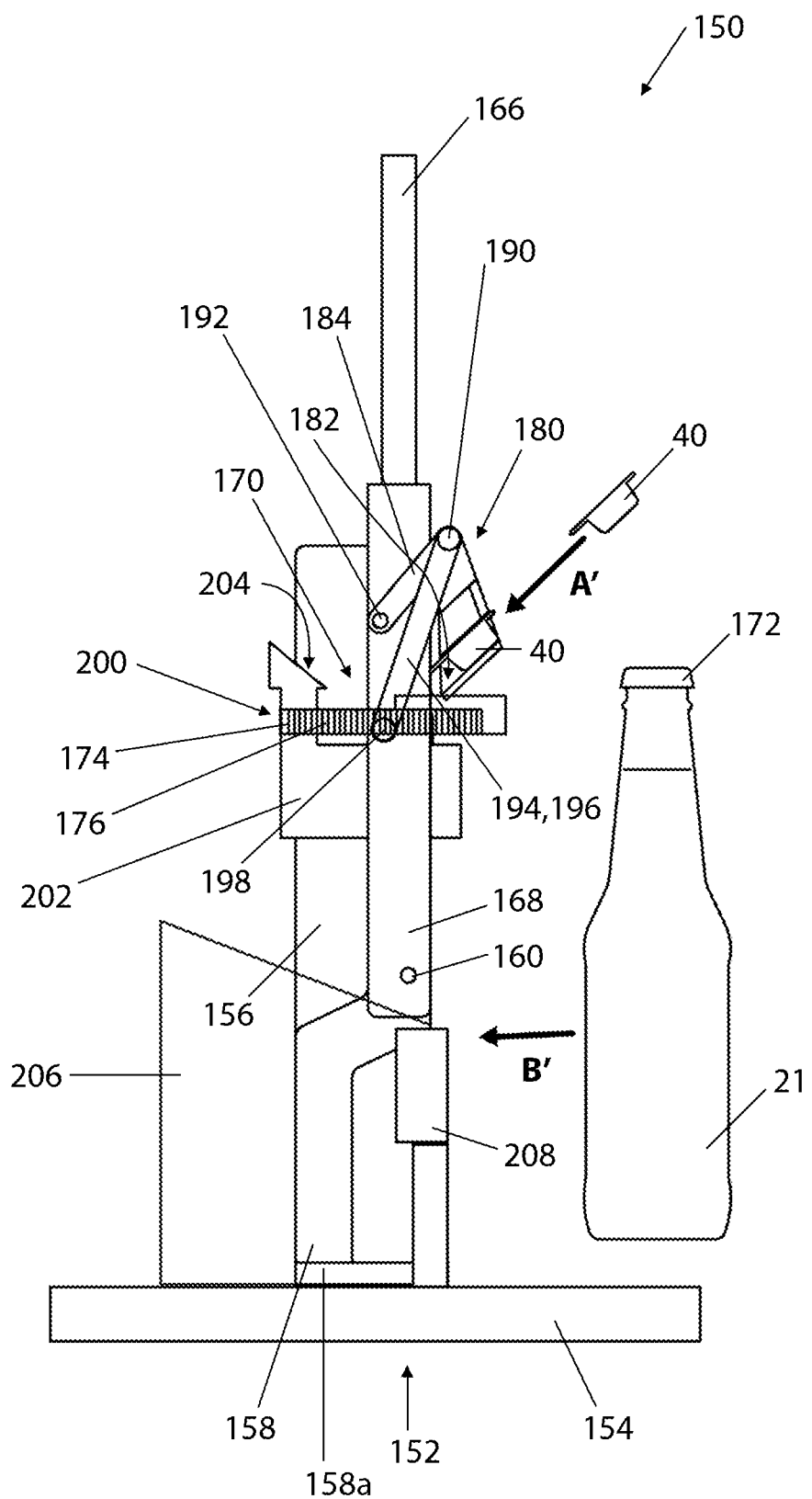
FIG. 25 is a diagrammatic side view of the apparatus of FIGS. 24a and 24b prior to insertion of the container and with the bin in the open position.

The apparatus 150 includes a capsule holder 180 into which a capsule 40 containing a desired additive, such as a flavouring substance, is inserted as depicted by arrow A' in FIGS. 24b and 25 either prior to, or after, insertion of the bottle 21 into the bottle holder 158 (arrow B' in FIG. 25). The capsule holder 180 includes a support surface 182 against which an inserted capsule 40 is supported.

The apparatus 150 includes a first control link 184 which rotatably mounts the capsule holder 180 on a strut 186 extending between the upper ends of the support members 156. The strut 186 includes downwardly depending pivotal mounts 188. A first end of the first control link 184 is rotatably mounted at pivotal mounting 190 and a second end of the first control link 184 is rotatably mounted at pivotal mountings 192 provided by the pivotal mounts 188.

The apparatus 150 includes a second control link 194 comprising a pair of spaced link arms 196. The link arms 196 are rotatably mounted at a first end at pivotal mounting 190 and at a second end at respective pivotal mountings 198 provided on the bottle holder 158. As will become apparent from the description that follows, the first and second control links 184, 194 control the movement of the capsule holder 180, and hence the orientation of the capsule 40, during movement of the bottle holder 158 between the first and second positions.

The apparatus 150 further includes a compression device 200 for applying a compressive force to the capsule 40. The compression device 200 comprises a compression block 202 having a compression surface 204. The compression block 202 is formed integrally with, or mounted on, the bottle holder 158 for movement with the bottle holder 158. The compression block 202 is movable between an inactive position, for example as shown in FIG. 25, and an active position shown in FIG. 27 in which the compression surface 204 of the compression block 202 urges the capsule 40 against the support surface 182 and thereby applies a compressive force to the capsule 40 to rupture it and thus eject the additive into the bottle 21.

In order to operate the beverage flavouring apparatus 150, a user initially inserts a bottled beverage 21 into the bottle holder 158 as depicted by arrow B' in FIG. 25 and, either before or after insertion of the bottle 21, the user inserts a capsule 40 into the capsule holder 180 as depicted by arrow A' in FIGS. 24b and 25. Prior to inserting the bottled beverage, the user places a bin 206, which is rotatably mounted on one of the upwardly extending support members 156 for example by a hinge 208, in an open position as shown in FIGS. 24a and 25. After inserting the bottled beverage 21 into the bottle holder 158, the user then places the bin 206 in the closed position shown in FIGS. 24b and 26 to 29 by rotating the bin 206, for example about the hinge 208. The user then operates the apparatus 150 by applying a force to the handle 166 so that the user pulls the handle 166 towards them as depicted by arrows C' and E' in FIGS. 26 and 27 respectively. The operating members 168 move in unison with the handle 166 about the pivotal mountings 160 and the bottle holder 158 rotates in a clockwise direction, as viewed in FIGS. 26 to 27, about the pivotal mountings 160 from the first position shown in FIGS. 24a, 24b and 25 to the second position shown in FIG. 27.

Figure 26:
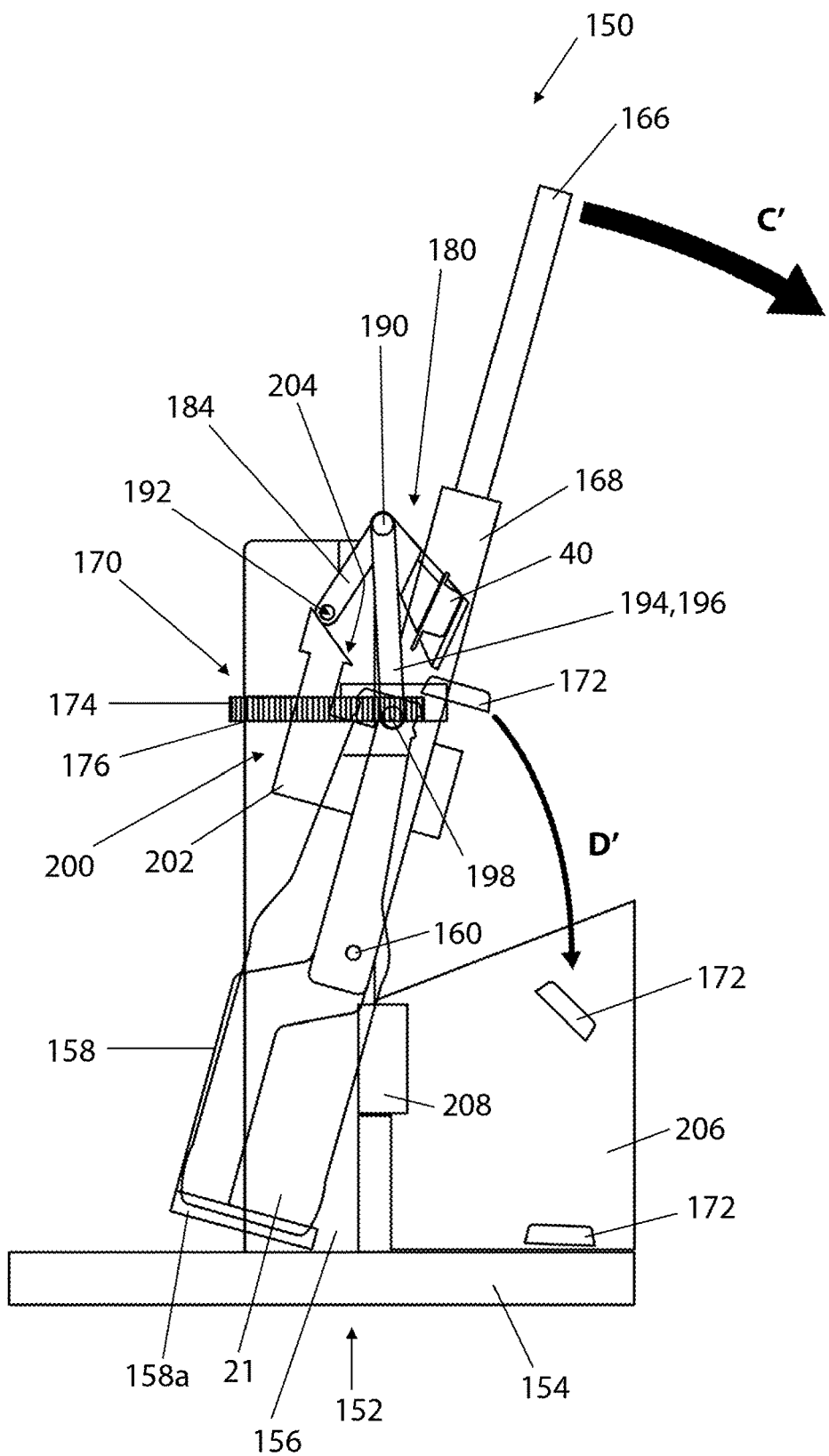
FIGS. 26 and 27 illustrate the movement of the container holder from a first position shown in FIGS. 24a, 24b and 25 to a second position shown in FIG. 27.

During the initial rotation of the bottle holder 158 caused by movement of the handle 166 to an intermediate position shown in FIG. 26, the formations around the outer circumferential surface of the screw cap 172 cooperate with the tooth formations 176 on the removal arm 174 and the bottle opener 170 thereby unscrews the screw cap 172 from the bottle 21 as best seen in FIG. 26 due to the application of a removal torque to the screw cap 172 as described above. Once removed, the screw cap 172 is ejected into the bin 206 as shown by arrow D' in FIG. 26.

Figure 27:
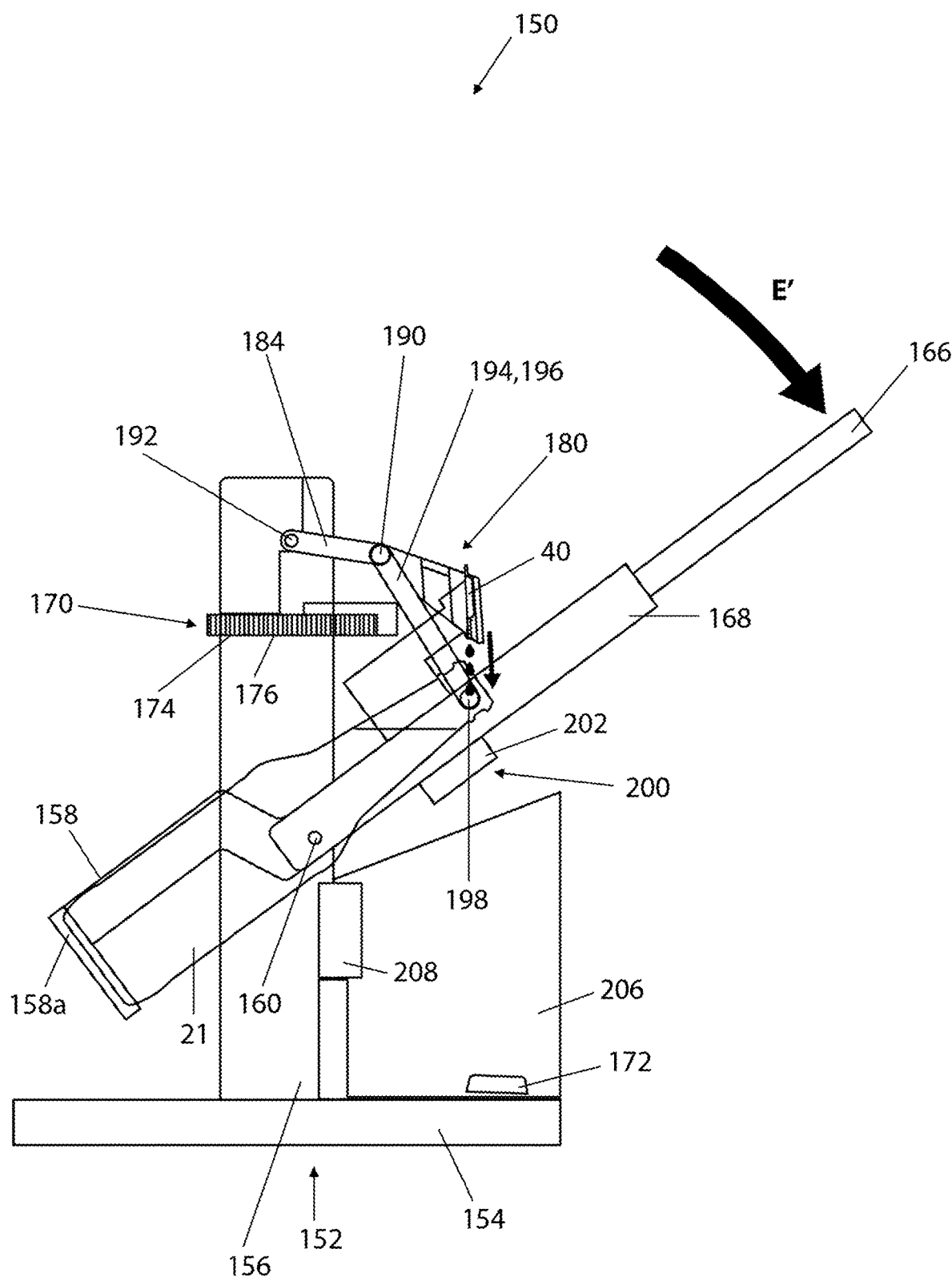

During movement of the bottle holder 158 from the first position towards the second position, the first and second control links 184, 194 control the movement of the capsule holder 180, moving it from an inactive position shown in FIG. 25 to an active position shown in FIG. 27. It will be noted that when the capsule holder 180 is in the active position, the support surface 182 is arranged substantially vertically and the capsule 40 is oriented with the outlet channel 40a pointing towards the open top of the bottle 21.

During movement of the bottle holder 158 from the first position towards the second position, the compression device 200 also rotates in unison with the bottle holder 158 and the compression block 202 moves from the inactive position shown in FIG. 25 to the active position shown in FIG. 27. As the compression block 202 approaches the active position, the compression surface 204 urges the capsule 40 against the support surface 182 thereby applying a compressive force to the capsule 40 to rupture it and thus eject the additive into the bottle 21.

It will again be noted from FIG. 27 that the additive is dispensed into the bottle 21 when the bottle 21 is in a tilted position. As explained in connection with the embodiment of FIGS. 17 to 23, this has been found to be particularly advantageous when the beverage contained in the bottle 21 is a carbonated beverage because it reduces foaming of the carbonated beverage and thereby reduces the likelihood of spillage and waste of the carbonated beverage as a result of excessive foaming.

Figure 28:
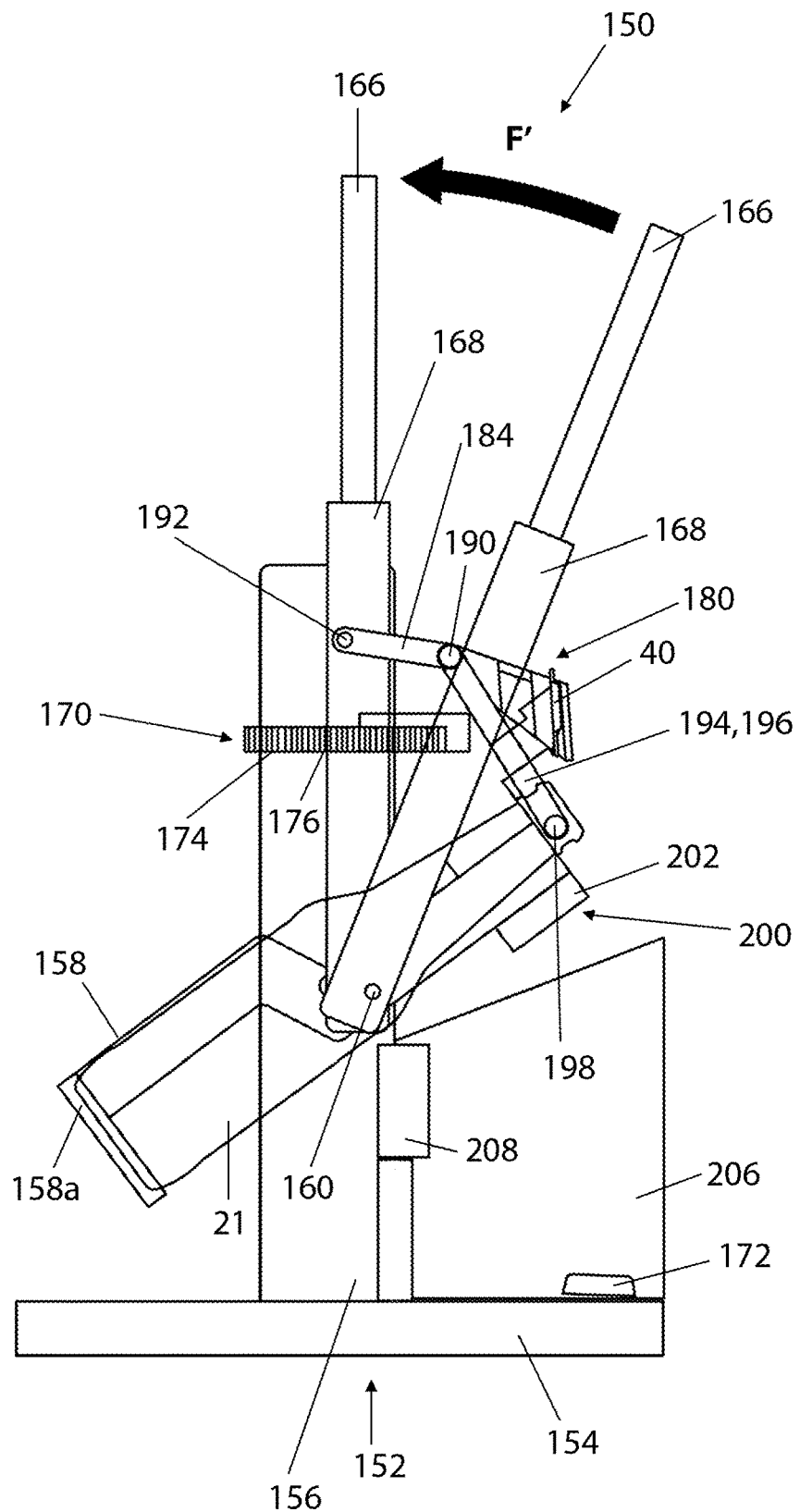
FIGS. 28 to 30 illustrate the return movement of the container holder from the second position shown in FIG. 27 to the first position shown in FIG. 30 to allow removal of the container from the container holder.
Figure 29:
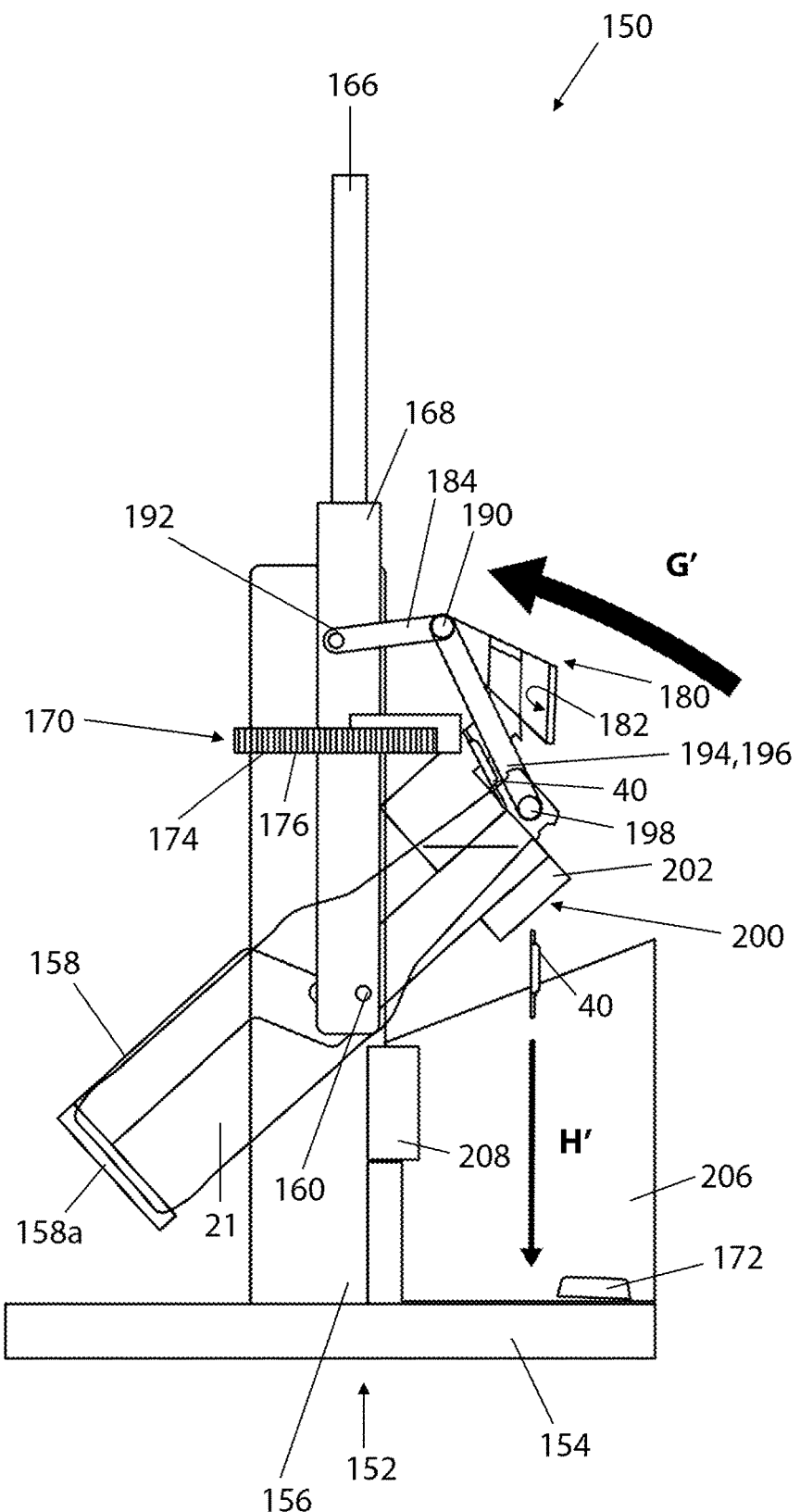

After the additive has been dispensed from the capsule 40 into the bottle 21, the handle 166 is rotated by a user as depicted by arrow F' in FIG. 28, in an anti-clockwise direction as viewed in the Figures, until it is returned to its original starting position, namely the substantially vertical upright position shown in FIG. 28. At the same time, rotation of the bottle holder 158 from the second position commences as shown by arrow G' in FIG. 29, and consequently the compression block 202 is moved by the first and second control links 184, 194 from the active position shown in FIG. 27 thereby releasing the compressive force applied to the capsule 40 by the compression surface 204. As the compression surface 204 moves away from the capsule 40, the used (compressed) capsule 40 is released from the capsule holder 180 and the used capsule 40 is ejected into the bin 206 as depicted by arrow H' in FIG. 29.

Figure 30:
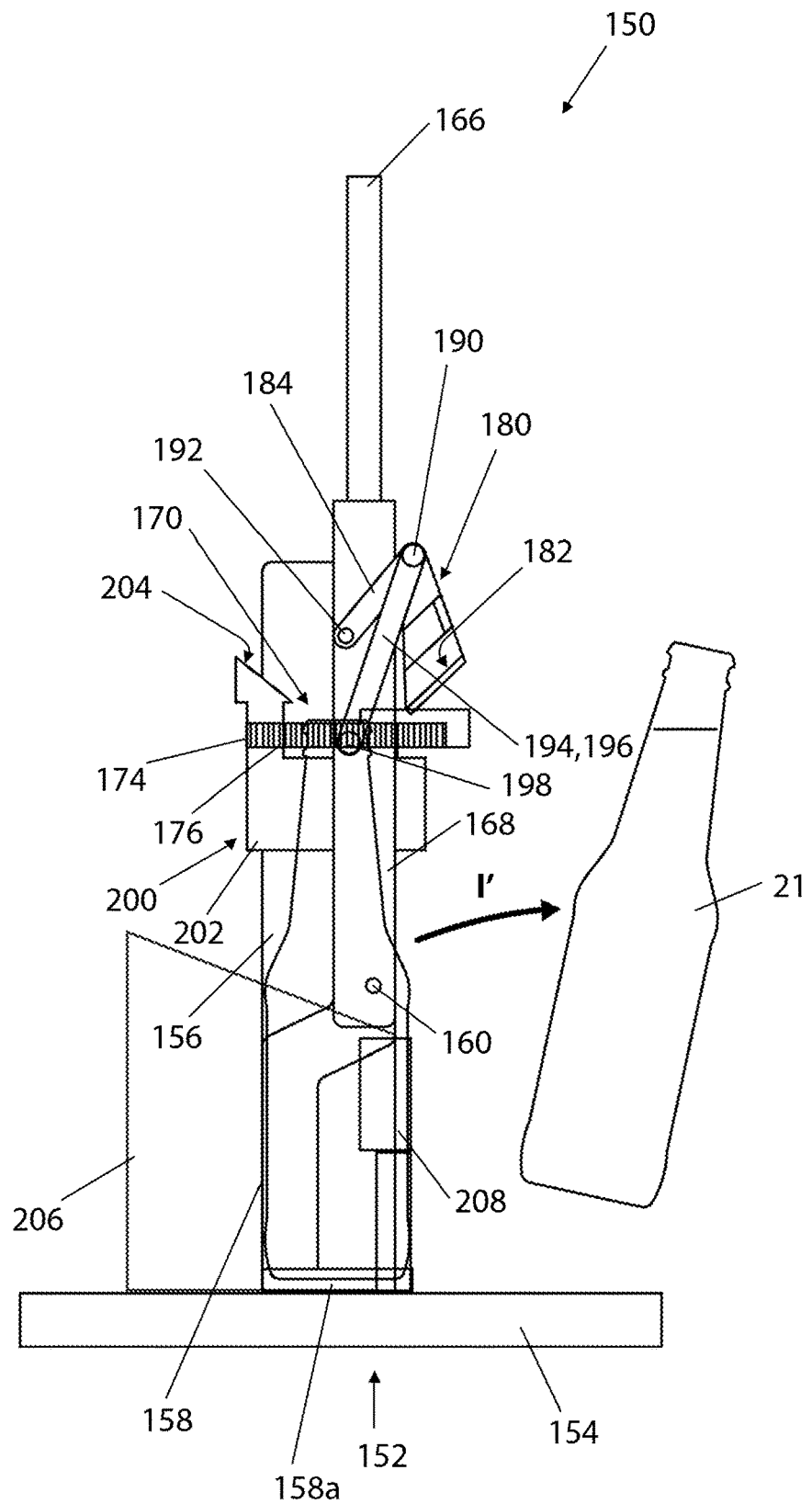

The bottle holder 158 continues to rotate in the anti-clockwise direction until it reaches the first position shown in FIG. 30 in which the bottle 21 is in a substantially upright vertical orientation. At the same time, the capsule holder 180 is moved back to the inactive position, also shown in FIG. 30. Once the bottle holder 158 has returned to the first position shown in FIG. 30 and the capsule holder 180 has returned to the inactive position, the bottle 21 containing the beverage and additive is removed from the bottle holder 158 for consumption, as depicted by arrow I' in FIG. 30.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. An apparatus for dispensing an additive into a container containing a liquid, the apparatus comprising:
  a support structure;
  a container holder for holding the container containing the liquid, the container holder being supported by the support structure;
  a capsule holder for holding a capsule containing the additive;
  a manipulator device operable to manipulate the capsule to dispense the additive into the container; and
  a container opener operable to engage a cap on the container when the container is positioned within the container holder, wherein, when engaged with the cap, the container opener is further operable to remove the cap prior to manipulation of the capsule by the manipulator device;
  wherein the container opener is configured to apply a removal force to the cap to remove the cap from the container, wherein the removal force includes a rotational torque; and
  wherein the apparatus is arranged so that a single operation causes an application of the removal force by the container opener and thereafter the manipulation of the capsule by the manipulator device, wherein the single operation is either provided by movement of the container holder from a first position to a second position or is provided by operation of an operating lever from the second position to a third position.

2. The apparatus according to claim 1, wherein the manipulator device is a compression device arranged to apply a compressive force to the capsule to rupture the capsule and thereby dispense the additive.

3. The apparatus according to claim 1, wherein the capsule holder is positioned above the container holder so that the additive is dispensed in a generally downward direction into the container.

4. The apparatus according to claim 1, wherein the apparatus includes a bin removably attached to the support structure.

5. The apparatus according to claim 4, wherein the apparatus is arranged to eject the capsule from the manipulator device into the bin following dispensing of the additive from the capsule into the container.

6. The apparatus according to claim 4, wherein the apparatus is arranged to eject the cap into the bin following removal of the cap from the container by the container opener.

7. The apparatus according to claim 1, wherein the container holder is rotatably mounted on the support structure for movement between the first position in which the container is disposed at an angle to the vertical and the second position in which the container is disposed in a substantially vertical upright position.

8. The apparatus according to claim 1, wherein the container holder is rotatably mounted on the support structure for movement between the first position in which the container is disposed in a substantially vertical upright position and the second position in which the container is disposed at an angle to the vertical.

9. The apparatus according to claim 7, wherein the manipulator device is arranged to manipulate the capsule to dispense the additive during movement of the container holder from the first position to the second position.

10. The apparatus according to claim 7, wherein the container opener is arranged to remove the cap from the container during movement of the container holder from the first position to the second position.

11. The apparatus according to claim 7, wherein the container holder is movable from the second position to the first position and the container containing the liquid and dispensed additive is removable from the container holder when the container holder is in the first position.

\* \* \* \* \*